(12) United States Patent
Hashimoto et al.

(10) Patent No.: US 12,372,789 B2
(45) Date of Patent: Jul. 29, 2025

(54) DISPLAY TERMINAL, APPLICATION CONTROL SYSTEM AND APPLICATION CONTROL METHOD

(71) Applicant: MAXELL, LTD., Kyoto (JP)

(72) Inventors: Yasunobu Hashimoto, Kyoto (JP); Ikuya Arai, Kyoto (JP); Kazuhiko Yoshizawa, Kyoto (JP); Sadao Tsuruga, Kyoto (JP); Hiroshi Shimizu, Kyoto (JP); Osamu Kawamae, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 17/421,220

(22) PCT Filed: Jan. 24, 2019

(86) PCT No.: PCT/JP2019/002279
§ 371 (c)(1),
(2) Date: Jul. 7, 2021

(87) PCT Pub. No.: WO2020/152828
PCT Pub. Date: Jul. 30, 2020

(65) Prior Publication Data
US 2022/0057636 A1 Feb. 24, 2022

(51) Int. Cl.
*G02B 27/01* (2006.01)
*G06F 1/16* (2006.01)
(Continued)

(52) U.S. Cl.
CPC ....... *G02B 27/0172* (2013.01); *G02B 27/017* (2013.01); *G06F 1/163* (2013.01);
(Continued)

(58) Field of Classification Search
CPC ........ G06F 3/012; G06F 3/011; G06F 3/0482; G06F 3/0484; G06F 3/04842;
(Continued)

(56) References Cited

U.S. PATENT DOCUMENTS

2008/0317346 A1* 12/2008 Taub ................. G06V 20/20
348/222.1
2012/0137259 A1* 5/2012 Campbell ............... G06F 3/017
715/863
(Continued)

FOREIGN PATENT DOCUMENTS

JP 2014-006582 A 1/2014
JP 2014-531662 A 11/2014
(Continued)

OTHER PUBLICATIONS

International Search Report of PCT/JP2019/002279 dated Feb. 26, 2019.

*Primary Examiner* — Dismery Mercedes
(74) *Attorney, Agent, or Firm* — Mattingly & Malur, PC

(57) ABSTRACT

Provide is a display terminal having a small display space, in which high operability is realized while convenience is maintained. A display terminal including a photographing device comprises: an image analysis unit configured to analyze an image captured by the photographing device, use region information that is information of a region on the image which corresponds to a real object existing in the external field, and refer to an icon DB so as to specify an icon related to the real object; and an app start unit configured to obtain an application associated with the specified icon from an app DB and start the application.

22 Claims, 20 Drawing Sheets

(51) Int. Cl.
*G06F 3/00* (2006.01)
*G06F 3/01* (2006.01)
*G06F 3/04817* (2022.01)
*G06T 19/00* (2011.01)
*G06V 20/20* (2022.01)
*G06V 20/70* (2022.01)

(52) U.S. Cl.
CPC .............. *G06F 3/005* (2013.01); *G06F 3/011* (2013.01); *G06F 3/04817* (2013.01); *G06T 19/006* (2013.01); *G06V 20/20* (2022.01); *G06V 20/70* (2022.01); *G02B 2027/0138* (2013.01); *G02B 2027/0178* (2013.01)

(58) Field of Classification Search
CPC ...... G06F 1/163; G06F 3/005; G06F 2111/18; G06F 3/0304; G06V 20/20; G06V 40/172; G06V 10/764; G06V 20/64; G06V 20/60; G06V 20/80; G06V 20/70; G06V 10/87; G06T 19/006; G06T 2215/16; G06T 7/73; G06T 7/70; G02B 27/017; G02B 27/0172; G02B 2027/0178; G02B 2027/014; G02B 2027/0138; G02B 27/0101; G02B 2027/0141
See application file for complete search history.

(56) References Cited

U.S. PATENT DOCUMENTS

| | | | | |
|---|---|---|---|---|
| 2012/0331457 | A1* | 12/2012 | Ryu | G06F 8/63 717/175 |
| 2013/0051615 | A1* | 2/2013 | Lim | G06Q 30/0261 382/103 |
| 2013/0055130 | A1* | 2/2013 | Rekimoto | G06F 3/002 715/810 |
| 2014/0059458 | A1* | 2/2014 | Levien | G06F 3/04817 715/765 |
| 2014/0267770 | A1* | 9/2014 | Gervautz | H04N 23/69 709/219 |
| 2014/0298248 | A1* | 10/2014 | Kang | G06F 3/04842 715/781 |
| 2015/0022444 | A1* | 1/2015 | Ooi | G06V 20/20 345/156 |
| 2015/0138081 | A1 | 5/2015 | Watsu et al. | |
| 2016/0021500 | A1* | 1/2016 | Won | H04W 4/021 455/456.2 |
| 2016/0092732 | A1* | 3/2016 | Black | G06F 18/22 382/103 |
| 2016/0316420 | A1* | 10/2016 | Mustafa | H04W 24/04 |
| 2017/0364238 | A1* | 12/2017 | Kim | G06F 3/0488 |
| 2018/0261011 | A1* | 9/2018 | Kollencheri Puthenveettil | G06F 16/435 |
| 2018/0322706 | A1* | 11/2018 | Drouin | G06F 3/0484 |
| 2018/0356882 | A1 | 12/2018 | Kaneko et al. | |
| 2018/0365898 | A1* | 12/2018 | Costa | G06F 3/012 |
| 2019/0080170 | A1* | 3/2019 | Baca | G06V 20/70 |
| 2019/0339840 | A1* | 11/2019 | Park | G06F 3/04815 |
| 2020/0363923 | A1* | 11/2020 | Lee | G06F 3/0484 |
| 2021/0064854 | A1* | 3/2021 | Chen | G06Q 20/40 |

FOREIGN PATENT DOCUMENTS

| | | |
|---|---|---|
| JP | 2017-015593 A | 1/2017 |
| JP | 2018-055416 A | 4/2018 |
| JP | 2019-004242 A | 1/2019 |
| WO | 2013/093906 A1 | 6/2013 |
| WO | 2014/129105 A1 | 8/2014 |
| WO | 2018/029831 A1 | 2/2018 |
| WO | 2018/230656 A1 | 12/2018 |

* cited by examiner

FIG. 4A
232
| ICON ID | APP NAME | APP ID | APP STORAGE LOCATION |
|---|---|---|---|
| TAXI 01 | TAXI DISPATCHING | | |
| ELECTRONIC MONEY 01 | | | |
| ELECTRONIC MONEY 02 | | | |
| CREDIT CARD 01 | | | |
| CREDIT CARD 02 | | | |
| CREDIT CARD 03 | | | |
| SHOPPING 01 | | | |
FIG. 4B
231
| ICON ID | ICON FIGURE | TYPE | CONTENT |
|---|---|---|---|
| TAXI 01 |  | TRAFFIC | |
| ELECTRONIC MONEY 01 |  | SETTLEMENT | |
| CREDIT CARD 01 |  | SETTLEMENT | |
| PAYMENT 01 |  | SETTLEMENT | |
| PAYMENT 02 |  | SETTLEMENT | |
| POINT 01 |  | SETTLEMENT | |
| TOILET 01 |  | FACILITY | |
| BUS 01 |  | TRAFFIC | |
| SHOES 01 |  | GOODS | |

| ICON ID | APP NAME | APP ID | APP STORAGE LOCATION |
|---|---|---|---|
| TAXI 01 | TAXI DISPATCH COMPANY A | | |
| | TAXI DISPATCH COMPANY B | | |
| | TAXI DISPATCH COMPANY C | | |

| STORE | LOCATION INFORMATION | USABLE APPLICATION (ICON ID) | | | |
|---|---|---|---|---|---|
| AAA | XXXX | ELECTRONIC MONEY 01 | ELECTRONIC MONEY 02 | CREDIT CARD 01 | CREDIT CARD 03 |
| BBB | XXXY | ELECTRONIC MONEY 01 | CREDIT CARD 01 | CREDIT CARD 02 | CREDIT CARD 03 |
| CCC | XXYY | CREDIT CARD 01 | | | |

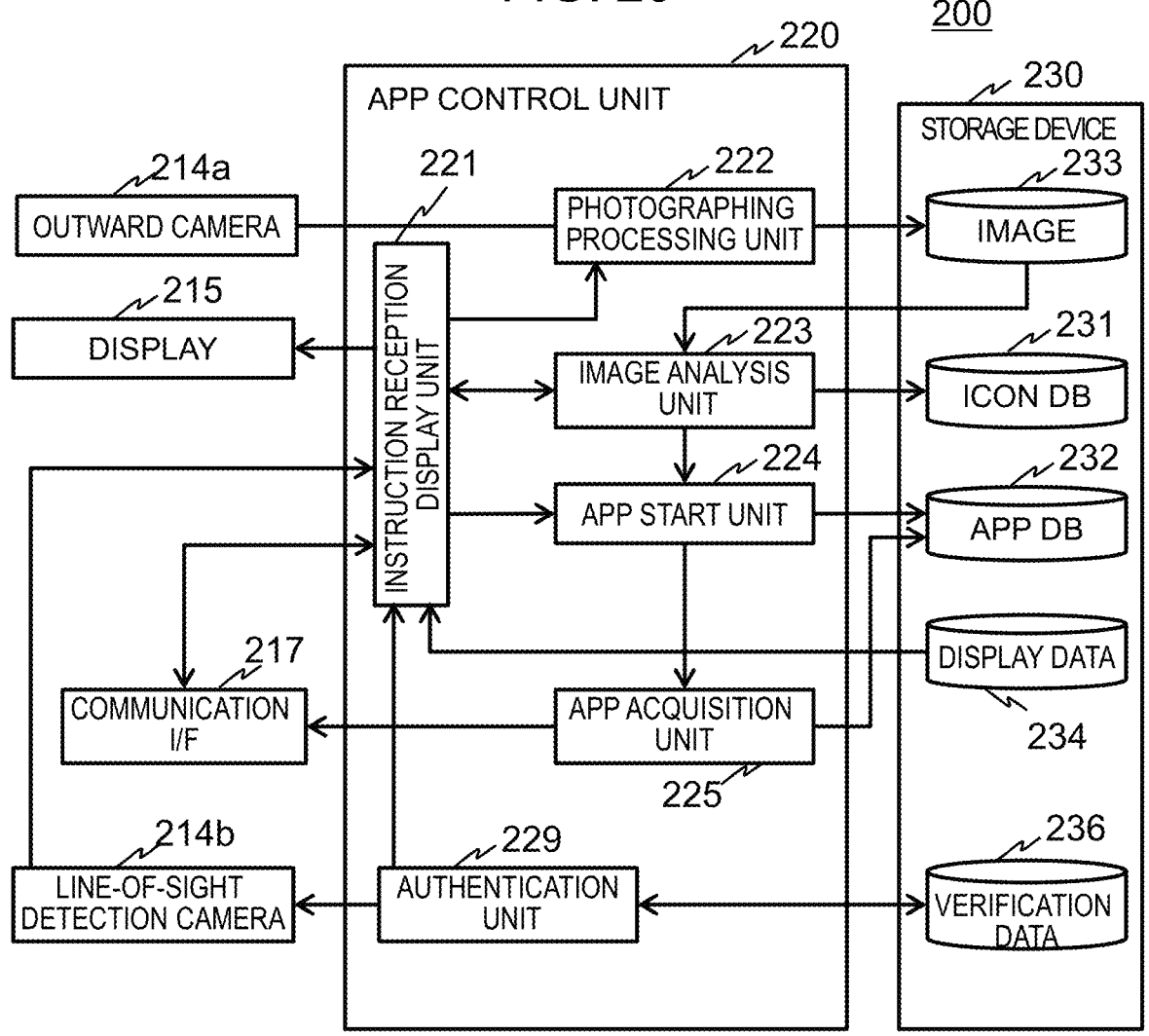

DISPLAY TERMINAL, APPLICATION CONTROL SYSTEM AND APPLICATION CONTROL METHOD

TECHNICAL FIELD

The present invention relates to a display control technique for a display terminal of which a display space is small.

BACKGROUND ART

As a display terminal of which a display space is small, for example, it has been known a Head Mounted Display (HMD) which is supported by the head of a user to display images in front of the user's eyes. Amongst HMDs, a display space of a transmission type (see-through type) HMD which enables the user to visually recognize both the external field and a display is particularly small. In such an HMD, in order to improve performance of operations by using the display, for example, Patent Literature 1 discloses the following technique.

An HMD system disclosed in Patent Literature 1 includes a coordinate system setting unit, a segment selection unit, and an image generation unit. The coordinate system setting unit sets, in a real space, a cylindrical coordinate system partitioned into a plurality of segments. The segment selection unit brings, based on a direction of the display, any of the plurality of segments into a selection stand-by state in the cylindrical coordinate system. When the selection of the segment held in the selection stand-by state is determined, the image generation unit generates a display image to be displayed on the display corresponding to the determined segment.

CITATION LIST

Patent Literature

Patent Literature 1: WO-2014-129105

SUMMARY OF INVENTION

Technical Problem

Similarly to information terminals such as commonly used personal computers and smartphones, an HMD is configured to arrange and display an icon of application on the display to accept selection of the icon, and start the application associated with the selected icon.

In the technique disclosed in Patent Literature 1, a cylindrical coordinate system partitioned into a plurality of segments is set in the real space around an HMD wearer. The HMD displays objects (icons) selectable in each segment, and an icon displayed in a segment in a line-of-sight direction of the HMD wearer is to be selected. With this configuration, a user (HMD wearer) can give an operation instruction without using an operation device which is held by hand to input the operation instruction, thereby making it possible to improve the operability of the HMD.

The technique disclosed in Patent Literature 1 is configured to display icons of all applications stored in the HMD and allow the user to select a desired icon from among them. At this time, since the segments for displaying each icon are provided in the cylindrical coordinate set around the user, the user needs to rotate his or her head in order to select the desired icon. In addition, the segments need to be prepared as many as the number of selectable icons. Accordingly, when the number of icons is large, the number of segments also increases and a space for each segment is reduced. As a result, the size of the icons displayed in each segment also decreases. Furthermore, since spaces are largely used to display the icons, a space for the user to visually recognize the external field also decreases. In this way, as the number of applications stored in the HMD increases, the convenience for the user is enhanced more but the operability of the HMD is reduced.

The present invention has been made in view of the circumstances above, and an object thereof is to provide a technique for a display terminal having a small display space, in which high operability is realized while convenience is maintained.

Solution to Problem

The present invention provides a display terminal including a photographing device, the display terminal including: an image analysis unit configured to analyze an image captured by the photographing device and use region information that is information of a region on the image which corresponds to a real object existing in an external field so as to specify an icon related to the real object; and a start unit configured to start an application associated with the icon as specified.

Furthermore, the present invention provides an application control system including a display terminal and a server connected to the display terminal via a network, the application control system comprising: a photographing device; a storage device; an image analysis unit configured to analyze an image captured by the photographing device and use information of a region on the image corresponding to a real object existing in an external field so as to specify an icon related to the real object; a start unit configured to determine whether an application associated with the icon as specified is stored in the storage device, and when determining that the application is stored, start the application; and an acquisition unit configured to acquire the application from the server when the start unit determines that the application is not stored in the storage device.

Still further, the present invention provides an application control method for a display terminal including a photographing device, comprising the steps of: capturing an image by means of the photographing device and acquiring the image; extracting a region corresponding to a real object existing in an external field from the image as acquired; determining whether an icon related to the region is registered in advance based on information of the region as extracted; and when the icon is registered, starting an application associated with the icon.

Advantageous Effects of Invention

According to the present invention, it is possible to provide a technique for a display terminal having a small display space, in which high operability is realized while convenience is maintained. The problems, configurations, and effects other than those described above will be clarified by explanation of the embodiments below.

BRIEF DESCRIPTION OF DRAWINGS

FIG. 4A explains an example of an application database according to the first embodiment, and FIG. 4B explains an example of an icon database according to the first embodiment.

FIG. 11 explains an example of a store database according to a seventh modification of the first embodiment.

FIG. 20 is a functional block diagram of an HMD according to a twelfth modification of the present invention.

DESCRIPTION OF EMBODIMENTS

Hereinafter, embodiments of the present invention will be described with reference to the drawings. Throughout the present description, the same functions are provided with the same reference signs unless otherwise noted, and repetitive explanation therefor will be omitted. It should be noted that the present invention is not limited to the embodiments described below.

First Embodiment

In a first embodiment, an application control system configured to start a desired application without displaying unnecessary icons on a display terminal is provided. A user does not have to look for an icon to start the desired application from among many icons.

Hereinafter, in the first embodiment (present description), a figure or symbol indicating a function of a program, which is used to start the program by the user's selection and execution instruction is referred to as an icon. Furthermore, in the first embodiment (present description), a program executed by an execution instruction to an icon is referred to as application or an app.

In the first embodiment, as a display terminal, an example of a Head Mounted Display (HMD) to be worn by a user, which is a transmission type (see-through type) HMD enabling the user to visually recognize both the external filed and a display, will be described.

Figure 1A:
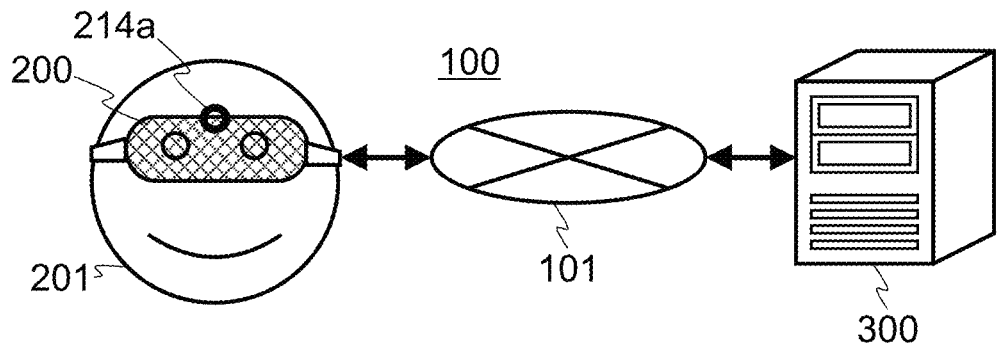
FIG. 1A is a system configuration diagram of an application control system according to a first embodiment, and FIG. 1B to FIG. 1E explain an outline of application control according to the first embodiment.

FIG. 1A is a system configuration diagram of an application control system 100 of the first embodiment. The application control system 100 of the first embodiment includes an HMD 200 and a server 300. The HMD 200 and the server 300 transmit and receive data to and from each other via a network 101.

The server 300 of the present embodiment is a server device installed by a provider of application-related services. In the first embodiment, the server 300 is configured to analyze request data transmitted from the HMD 200 and provide related services to the HMD 200 which is a request source. For example, the server 300 holds various types of applications and provides an application to the HMD 200 in response to a request from the HMD 200. The server 300 is, for example, an app store.

In FIG. 1A, the number of the HMD 200 and the server 300 connected to the network 101 is only one, respectively, meanwhile, it is not limited to the above. Furthermore, other devices may be further connected thereto to transmit and receive data therebetween.

Firstly, an outline of application control performed by the application control system 100 of the first embodiment will be described with reference to FIG. 1B to FIG. 1E.

Figure 1B:
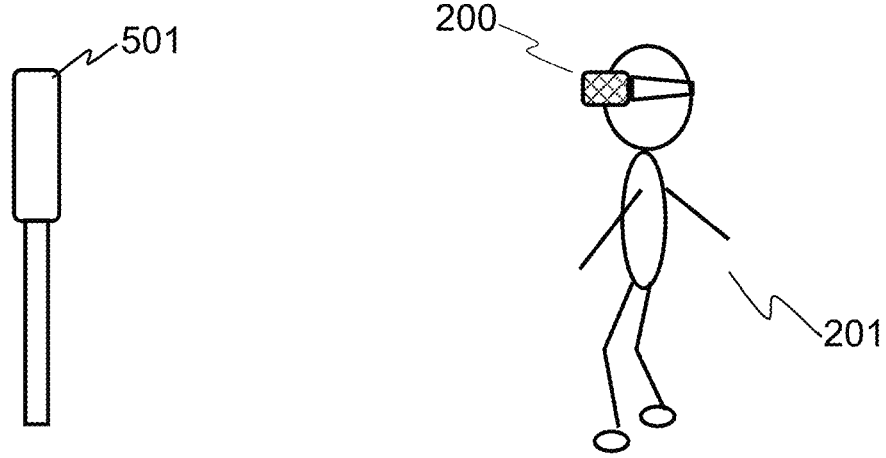

As illustrated in FIG. 1B, when a user 201 wearing the HMD 200 finds a figure that is indicated on a signboard 501 and looks like an icon, he or she turns on a search mode of the HMD 200. The search mode will be described later. At this time, the user 201 behaves so that the figure is included in a photographing region displayed on the display of the HMD 200, for example, by adjusting the distance to the figure or the orientation of the user with respect to the figure.

Figure 1C:
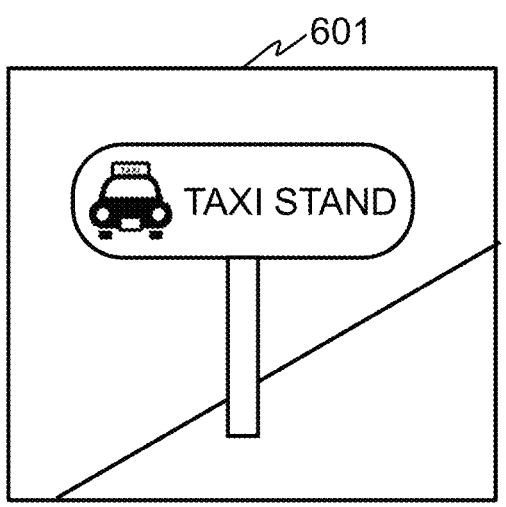

In response to the turning on of the search mode, the HMD 200 acquires an image of a visual field of the user 201. FIG. 1C illustrates an example of an image 601 as acquired. Here, the image 601 is an image of a taxi stand.

Figure 1D:

Then, the HMD 200 analyzes the acquired image 601, and extracts an area 602 (hereinafter, referred to as an object) on the image 601 which corresponds to the figure in the actual visual field. In FIG. 1D, a rectangular area shown by a dotted line is the extracted object 602. Details of extraction will be described later.

Figure 1E:
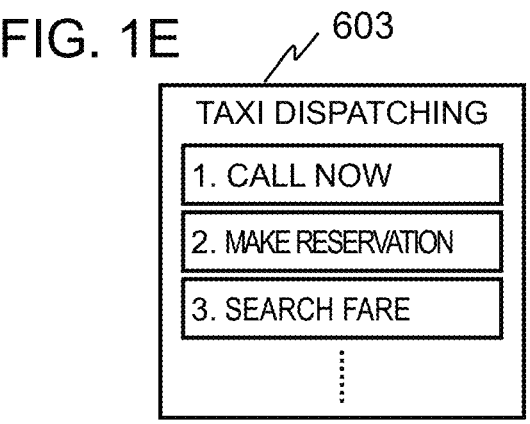

Upon extracting the object 602, the HMD 200 determines that an icon specified by the object 602 is selected, and as illustrated in FIG. 1E, starts an application that is associated with the specified icon and held therein. Here, an example of starting a taxi dispatch app 603 will be described. The user 201 selects and executes a desired process from among those of the taxi dispatch app 603.

Conventionally, the HMD 200 displays icons of all available applications stored therein and allows the user to select and execute an icon required at that time from among all the icons. On the other hand, the first embodiment is configured to specify an image of a real object in the visual field of the user 201 as an icon, and automatically start the application associated with the icon. With this configuration, the user 201 does not need to look for and select a desired icon from among many icons. The HMD 200 of the present invention can start the relevant application necessary on the spot as if an actual figure existing therearound was used instead of an icon.

Hereinafter, the HMD 200 of the present embodiment for implementing the processing above will be described.

[Hardware Configuration]

Figure 2:
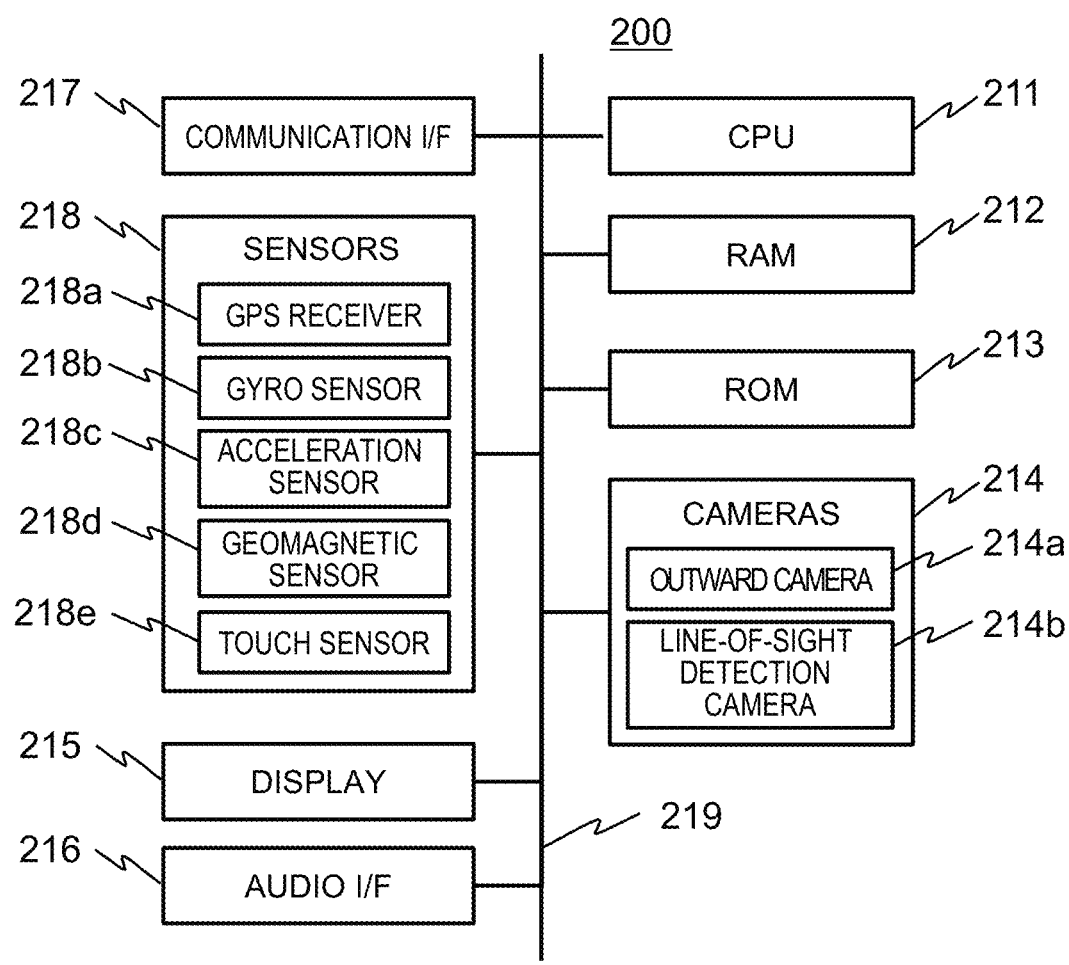
FIG. 2 is a hardware configuration diagram of an HMD according to the first embodiment.

FIG. 2 is a hardware configuration diagram of the HMD 200 of the first embodiment. The HMD 200 of the present embodiment basically has the same configuration as that of a general-purpose computer (information processing apparatus). That is, as illustrated in FIG. 2, the HMD 200 includes a CPU 211, a RAM 212, a ROM 213, cameras 214, a display 215, an audio interface (I/F) 216, a communication interface (I/F) 217, sensors 218, and a bus 219 for connecting the respective components.

The cameras 214, which serve as photographing devices, include an outward camera 214a and a line-of-sight detection camera 214b. The outward camera 214a is mounted on the HMD 200 to include the visual field of the user 201 in its photographing range. The line-of-sight detection camera 214b detects a line-of-sight direction of the user 201. The line-of-sight detection camera 214b is mounted on the HMD 200 to include the iris, pupil, and the like of the eye of the user 201 in its photographing range.

The display 215 displays images acquired by the cameras 214 and screen data generated in the HMD 200. The display 215 is provided with, for example, a transmission type liquid crystal device, an organic EL device, or an optical scanning device using a Micro Electro Mechanical Systems (MEMS). Meanwhile, the device provided with the display 215 is not limited thereto, and any device may be used as long as it can realize a structure which allows the other side of the display 215 to be seen through while allowing an image to be displayed on the display 215.

The audio I/F 216 is, for example, a microphone, a speaker, and a buzzer. The audio I/F 216 is configured to input an external sound and output a sound such as a sound created in the HMD 200 and a sound or music transmitted through the communication I/F 217. Meanwhile, in the present embodiment, the audio I/F 216 may not be provided.

The communication I/F 217 includes such as a coding circuit, a decoding circuit, and an antenna to transmit and receive data to and from other devices through the network 101 (data communication). In the present embodiment, the communication I/F 217 is an I/F for connecting the HMD 200 to the network 101 via an access point (not illustrated) or via a base station of a mobile telephone communication network (not illustrated). The HMD 200 transmits and receives data to and from each server 300 connected to the network 101 via the communication I/F 217.

The connection between the HMD 200 and the access point is performed by, for example, a wireless communication system such as Wi-Fi (registered trademark) or by other communication systems. The connection between the HMD 200 and the base station of the mobile telephone network is performed by, for example, a Wideband Code Division Multiple Access (W-CDMA, registered trademark) method, a Global System for Mobile communications (GSM) method, a Long Term Evolution (LTE) method, or other communication methods.

The sensors 218 are configured to detect such as a current position, inclination, and velocity of the HMD 200, and an operation by the user 201. The HMD 200 includes, for example, a positional information acquisition sensor such as a GPS receiver 218a, a gyro sensor 218b, an acceleration sensor 218c, a geomagnetic sensor 218d, and a touch sensor 218e, as the sensors 218. Meanwhile, the sensors 218 do not necessarily include all the sensors above.

In this connection, both the RAM 212 and the ROM 213 are collectively referred to as a storage device 230 in the case of not requiring distinguishment between them. In addition, the audio I/F 216 may not be provided.

[Functional Block]

Figure 3A:
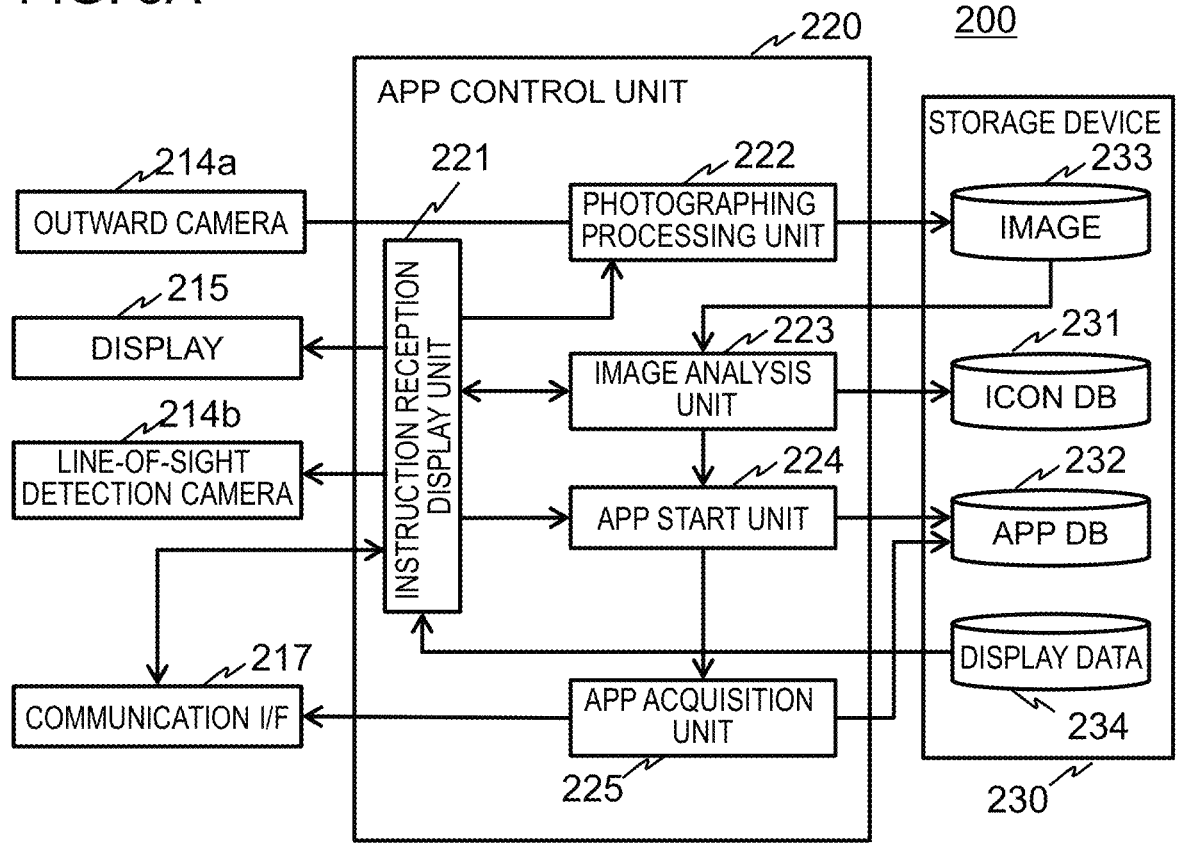
FIG. 3A is a functional block diagram of an app control unit according to the first embodiment.

FIG. 3A is a functional block diagram of an application control unit (referred to as an app control unit) 220, which is the function related to the application control processing, of the HMD 200 according to the first embodiment. The app control unit 220 includes an instruction reception display unit 221, a photographing processing unit 222, an image analysis unit 223, an app start unit 224, and an app acquisition unit 225.

The CPU 211 loads programs stored in the storage device 230 onto a memory such as the RAM 212 and executes them so that each of the functions are implemented.

The storage device 230 stores an icon database (icon DB) 231, an application database (app DB) 232, an image 233, and display data 234.

The app DB 232 is a database in which an icon and an application that is started by selecting the icon are associated and are registered. FIG. 4A illustrates an example of the app DB 232.

As illustrated in FIG. 4A, the app DB 232 registers therein information of each application associated with each icon. In the first embodiment, the app DB 232 registers therein, for each icon ID 232a which is information for uniquely identifying a figure or symbol of an icon (hereinafter referred to as an icon figure or icon), a name (app name) 232b of the application, an app ID 232c which is information for uniquely identifying the application, and an app storage location 232d which is information of a location where the application is stored. The app storage location 232d is an address in the storage device of the HMD 200. If the application is not held in the storage device of the HMD 200, the app storage location 232d may be on the network, for example, a URL that is a location of the server 300 that holds the application.

The icon DB 231 is a database in which icons are registered. FIG. 4B illustrates an example thereof.

As illustrated in FIG. 4B, each record of the icon includes an icon ID 231a, an icon figure 231b, a type (category) 231c, and a content 231d. The icon ID 231a is information for uniquely identifying an icon. The icon figure 231b is shape information of a figure to be displayed on the display 215 as an icon.

As the type 231c, a classification set in advance for each processing content of an application associated with an icon is registered. In the first embodiment, the classification includes, for example, traffic, settlement, facility, goods, shopping, game, music, and video distribution.

As the content 231d, a description of the icon figure 231b and/or an outline of the processing content of the application associated with the icon are registered. The information registered as the content 231*d* is used at the time of semantic analysis of a captured image, which will be described later, to specify a relevant icon.

The storage device 230 stores therein the image 233 acquired by the photographing processing unit 222. In addition, the storage device 230 stores therein various pieces of data as the display data 234 which are used when the instruction reception display unit 221 generates the screen data to be displayed on the display 215.

The instruction reception display unit 221 is configured to receive an operation instruction from the user 201. In addition, the instruction reception display unit 221 generates the screen data based on processing results of each unit, and displays them on the display 215.

The instruction reception display unit 221 displays, for example, various operation instruction buttons (regions) on the display 215 to receive a selection instruction from the user 201. The data of the operation instruction button is stored in advance in the storage device.

An instruction such as selection by the user 201 is given by, for example, a line of sight. That is, the instruction reception display unit 221 detects a line-of-sight direction of the user 201 and uses it as a substitute for a pointing device, thereby determining that a region on the display 215 which is on the line of sight is selected.

In order to detect the line-of-sight direction, existing techniques are used. For example, a technique for detecting the line-of-sight based on a position of a moving point of the eye of the user 201 with respect to a stationary reference point may be employed. As the stationary reference point, for example, the inner corner of the eye is used. As the moving point, for example, the pupil or iris is used. These positions are obtained by analysis of an image captured by the line-of-sight detection camera 214*b*. In this connection, for example, the predetermined number of eye blinking may be further used to detection of a selection instruction.

Figure 3B:
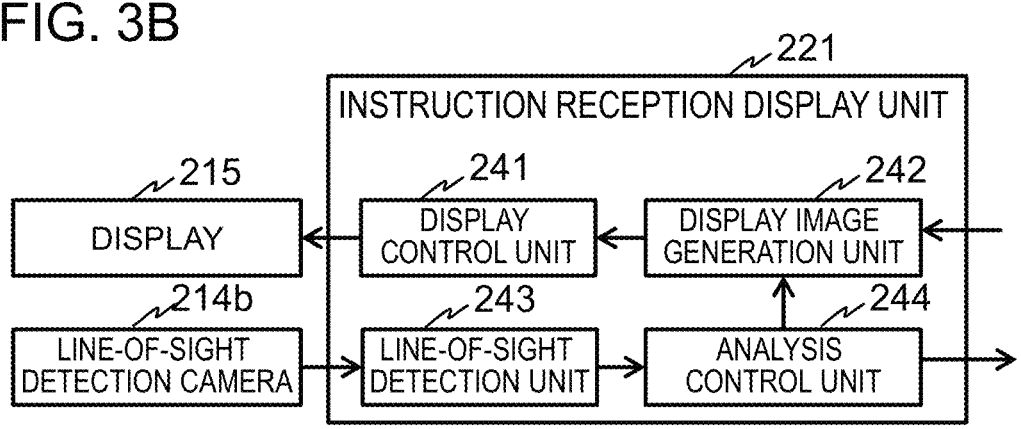
FIG. 3B is a functional block diagram of a line-of-sight instruction function of an instruction reception display unit according to the first embodiment.

FIG. 3B illustrates a functional block of the functions of the instruction reception display unit 221, which are implemented by mainly a line-of-sight instruction. As illustrated in FIG. 3B, the instruction reception display unit 221 includes a display control unit 241, a display image generation unit 242, a line-of-sight detection unit 243, and an analysis control unit 244.

The display image generation unit 242 is configured to generate screen data to be displayed on the display 215. The screen data is generated by using, for example, various pieces of data stored in the storage device 230.

The display control unit 241 is configured to display, on the display 215, the screen data generated by the display image generation unit 242.

The line-of-sight detection unit 243 is configured to detect a line-of-sight direction based on an image captured by the line-of-sight detection camera 214*b*.

The analysis control unit 244 is configured to analyze the line-of-sight direction detected by the line-of-sight detection unit 243, identify the instruction, and output a signal to each unit. When the line-of-sight direction remains in the same direction for a predetermined period, the analysis control unit 244 determines that an image region existing on the line-of-sight is selected. Furthermore, when the line-of-sight direction remains in the same direction for a predetermined period as well as the predetermined number of eye blinking are performed at a predetermined interval, the analysis control unit 244 determines that the image region is selected.

The operation instruction includes, for example, an instruction for setting the processing of the HMD 200 to the search mode (search instruction), a selection instruction for selecting a desired icon or application from among an extracted icon group, and an execution instruction for executing the selected application. Upon receiving the respective instructions, the instruction reception display unit 221 outputs a selection instruction signal and an execution instruction signal, respectively.

The search mode is a mode for capturing an image of the actual visual field of the user 201. Upon receiving the search instruction, the instruction reception display unit 221 outputs, to the photographing processing unit 222, a photographing instruction signal as an instruction for acquiring an image. The instruction reception display unit 221 continues to output the photographing instruction signals until receiving a search mode termination instruction.

The instruction reception display unit 221 receives the search instruction, for example, when the user 201 selects a search instruction button displayed on the display 215. The search instruction button is displayed on the display 215, for example, after the HMD 200 is started or receives an instruction to start the application control processing.

The selection instruction receives, for example, an instruction for receiving selection of a desired icon from among a plurality of icons displayed on the display 215. The execution instruction is an instruction of execution of an application. By means of the execution instruction, the reception display unit 221 accepts an instruction for executing the application associated with the icon selected by the selection instruction.

Upon receiving the photographing instruction signal from the instruction reception display unit 221, the photographing processing unit 222 captures an image of the visual field range (actual visual field) of the user 201 at a predetermined time interval. The outward camera 214*a* is used to capture the image above. The image 233 acquired by the photographing above is stored in the storage device 230.

The photographing processing unit 222 may be configured to capture an image once at the timing when the search mode is turned on.

When the image 233 acquired by the photographing processing unit 222 is stored in the storage device 230, the image analysis unit 223 analyzes the image 233 and extracts an icon in the image 233.

Specifically, the image analysis unit 223 extracts a region on the image 233 which corresponds to an actual object (real object) existing in the external field as an object on the image. Then, the image analysis unit 223 specifies an icon related to the real object by using region information for specifying the extracted region of the object.

The image analysis unit 223 extracts the object by a method of, for example, well-known contour extraction (edge detection), and then, determines whether each object matches the icon figure 231*b* held in the icon DB 231 for all the extracted icons.

The determination above is performed by, for example, a known shape matching method. The image analysis unit 223 determines an object that matches the icon figure 231*b* held in the icon DB 231 as an icon from among the extracted objects. Then, the image analysis unit 223 specifies the icon figure 231*b* that matches the object as the icon related to the object.

The term "match" used herein is not limited to perfect matching, but includes a collation result having a certain degree of similarity.

Objects to be extracted from the image 233 by the image analysis unit 223 may be various real objects such as a mark displayed on the street, a mark displayed or notified at a store, and a mark printed on a product tag. The objects may appear in various ways such as by being painted or printed on a seal, and displayed on a display device such as a tablet terminal and a guide plate.

In the case where a plurality of objects is determined as icons, the image analysis unit 223 displays them on the display 215. Then, the image analysis unit 223 receives a selection instruction via the instruction reception display unit 221. At this time, the image analysis unit 223 may be configured to display the icon figures 231b that match the objects on the display 215, or the image data itself of the regions of the extracted objects.

The icon may be displayed directly on the retina of the eye. A method of displaying the icon is not limited thereto as long as it can visibly display the external scene existing in the photographing range of the outward camera 214a.

When receiving the selection instruction for selecting the displayed icon, the instruction reception display unit 221 displays the selected icon in a display mode different from that for the non-selected icons, for example, by changing its size and/or color, or enclosing it in a special box. Furthermore, for example, only the selected icon may be displayed largely while the other icons are displayed in the smaller size than the selected icon, or only the selected icon may be displayed in color while the other icons are displayed in gray scale.

The app start unit 224 is configured to execute an application associated with the selected icon. Specifically, the app start unit 224 refers to the app DB 232 and specifies the application associated with the selected icon. Here, the app start unit 224 extracts the app storage location 232d which is associated with the icon ID 231a/232a of the selected icon and registered in the app DB 232, and loads and starts the program of the application from the location registered in the app storage location 232d onto the RAM 212.

In the case where the application of the selected icon is not stored in the storage device 230, the app start unit 224 transmits an app acquisition signal to the app acquisition unit 225. The case above includes, for example, a case where a URL on the network 101 is registered in the app storage location 232d of the selected icon, or a case where the icon ID 232a of the selected icon is not registered in the app DB 232. The app acquisition signal includes the icon ID 232a. When the URL is registered in the app storage location 232d, the app acquisition signal further includes the URL.

Upon receiving the app acquisition signal from the app start unit 224, the app acquisition unit 225 acquires, from the server 300, the application associated with the icon ID 232a included in the app acquisition signal. When receiving the URL, the app acquisition unit 225 accesses the URL to acquire the application.

At this time, the app acquisition unit 225 transmits an application acquisition request including the icon ID 232a to the server 300 and receives the application. In other words, the app acquisition unit 225 downloads the application.

Furthermore, the app acquisition unit 225 stores the application as provided in the storage device 230, makes its storage location associated with the icon ID 232a, and registers it in the app storage location 232d of the app DB 232. Then, the app acquisition unit 225 notifies the app start unit 224 of completion of the registration. Upon receiving the notification, the app start unit 224 starts the application.

Since the downloaded application is registered in the app DB 232, it can be used without any additional processing from the next time.

When one object is determined as the icon as a result of analysis by the image analysis unit 223, the selection instruction may not be made. In this case, when the image analysis unit 223 determines that the extracted object is an icon, the app start unit 224 executes the application associated with the icon without any additional processing.

The HMD 200 according to the first embodiment further includes control units (not illustrated) for controlling operations of each hardware. Specifically, the control units above include a communication control unit configured to control an operation of the communication I/F 217, an outward camera control unit configured to control an operation of the outward camera 214a, and a sensor control unit provided for each of the sensors 218 and configured to control an operation of each of the sensors 218.

The communication control unit controls a wireless communication function of a mobile communication system included in the HMD 200, such as Wi-Fi, Bluetooth (registered trademark), 4G, and/or 5G, and realizes transmission and reception of data with an external device. The sensor control unit outputs a signal detected by each sensor.

[Processing Flow]

Figure 5:
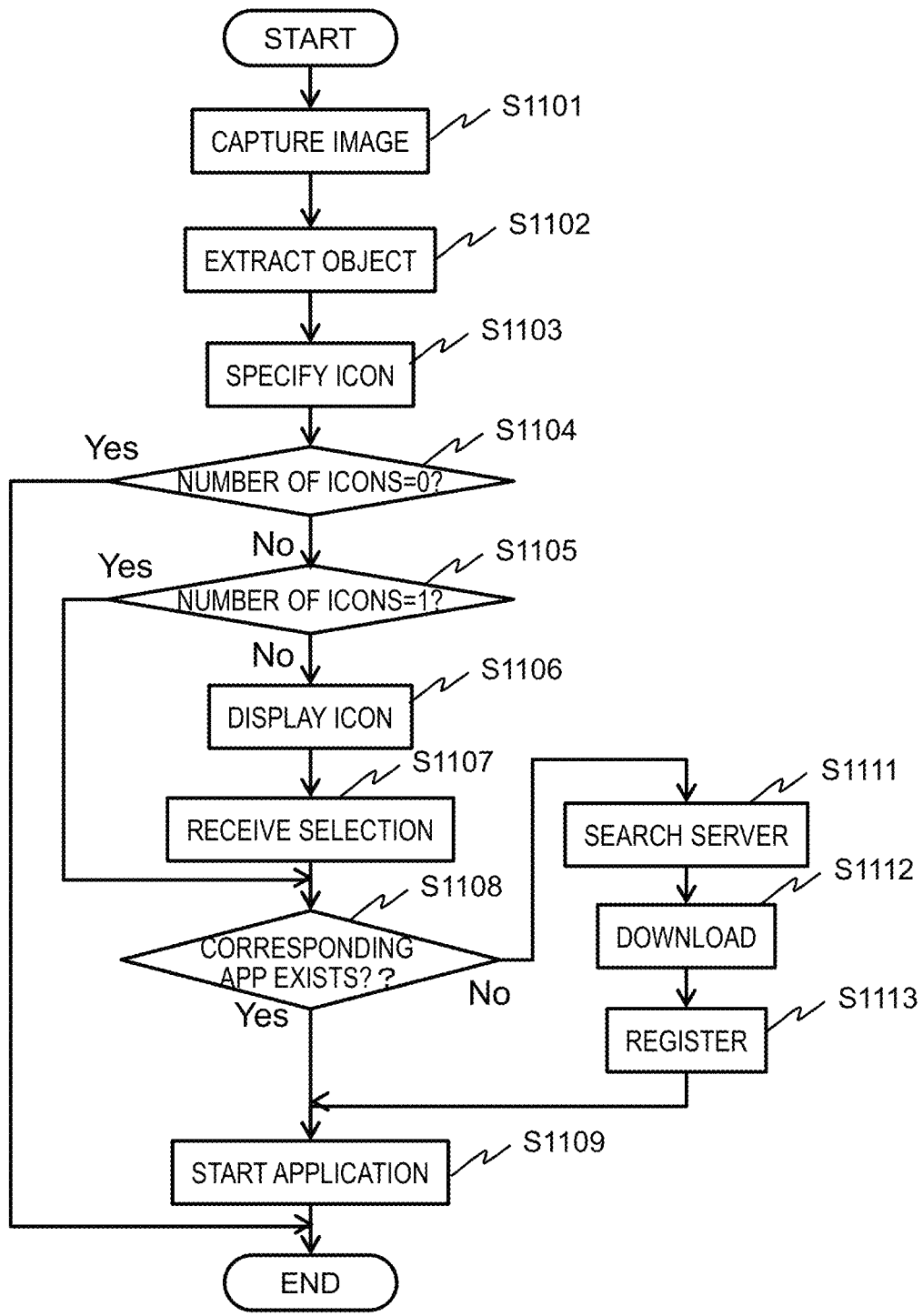
FIG. 5 illustrates a flowchart of application control processing according to the first embodiment.

Next, a flow of the application control processing by the app control unit 220 of the first embodiment will be described. FIG. 5 illustrates a processing flow of the application control processing according to the first embodiment. The HMD 200 starts the following processing upon receiving the search instruction.

The photographing processing unit 222 causes the outward camera 214a to capture an image and acquires the image 233 including the actual visual field of the user 201 (step S1101). The photographing processing unit 222 stores the acquired image 233 in the storage device 230.

The image analysis unit 223 analyzes the image 233 and extracts an object (step S1102). Then, the image analysis unit 223 determines whether the extracted object is an icon, and when it is an icon, specifies the icon (step S1103). Here, in order to make the determination above, the image analysis unit 223 refers to the icon DB 231 to specify whether the icon figure 231b having a shape similar to that of the object is registered. That is, when the icon figure 231b similar to the extracted object is registered in the icon DB 231, the image analysis unit 223 determines that the object is the similar icon. Then, the image analysis unit 223 extracts the icon ID 231a which has been associated with the icon figure 231b determined as the similar icon and has been registered in the icon DB 231 so as to specify the icon. Furthermore, the image analysis unit 223 counts, as the number of icons, the number of objects which are specified as the icons during the analysis of the image 233.

The instruction reception display unit 221 determines whether the number of icons is 0 (step S1104). When the number of icons is 0, the processing is terminated.

On the other hand, when the number of icons is not 0, the instruction reception display unit 221 determines whether the number of icons is 1 (step S1105).

When the number of icons is 1 (step S1105; YES), the processing proceeds to step S1108 which will be described later.

On the other hand, when the number of icons is not 1 (S1105; No), in other words, when there is more than one icon, the instruction reception display unit 221 displays, on the display 215, each icon figure 231b for all the specified icons (step S1106). Then, the instruction reception display unit 221 receives a selection instruction (step S1107).

The app start unit 224 refers to the app DB 232 and determines whether the application associated with the icon ID 231a/232a of the selected icon is registered in the HMD 200 (step S1108). Here, the app start unit 224 determines that the application is registered when an address in the storage device 230 is stored as the app storage location 232*d*.

When the application is registered in the HMD 200, the app start unit 224 starts the application (step S1109), and the processing is terminated.

On the other hand, when the application is not registered in the HMD 200, the app start unit 224 provides the app acquisition unit 225 with an instruction for acquiring the application. The app acquisition unit 225 accesses and searches the server 300 (step S1111) to acquire (download) the application associated with the icon ID 232*a* of the icon from the server 300 (step S1112). The app acquisition unit 225 makes the downloaded application associated with the icon ID 232*a* and registers it in the app DB 232 (step S1113). Then, the processing proceeds to step S1109.

In the first embodiment, during the search mode, the app control unit 220 executes the processing above at a predetermined time interval.

Here, it is configured to clear the previous display data and then newly display data at the time of transition of each process so as to prevent the difficulty in seeing a display screen which may occur due to display of unnecessary data. Of course, the screen display method described above is applicable to all screen transitions in the first embodiment.

[Example of Use]

Next, a specific example of use of the application control system according to the present embodiment will be described with reference to FIG. 6A to FIG. 7C. Hereinafter, an example in which the user 201 wants to start vehicle dispatch application near a taxi stand will be described. The vehicle dispatch application is an application for requesting vehicle dispatching, making reservation, and searching fare.

As illustrated in FIG. 1B, when coming near the taxi stand, the user 201 sees a signboard 501 on which the figure that is the same as that of the icon of the vehicle dispatch application is indicated. The user 201 who has seen the signboard 501 selects a search instruction button 711 displayed on the display 215 by providing an instruction by means of a line of sight.

Figure 6A:
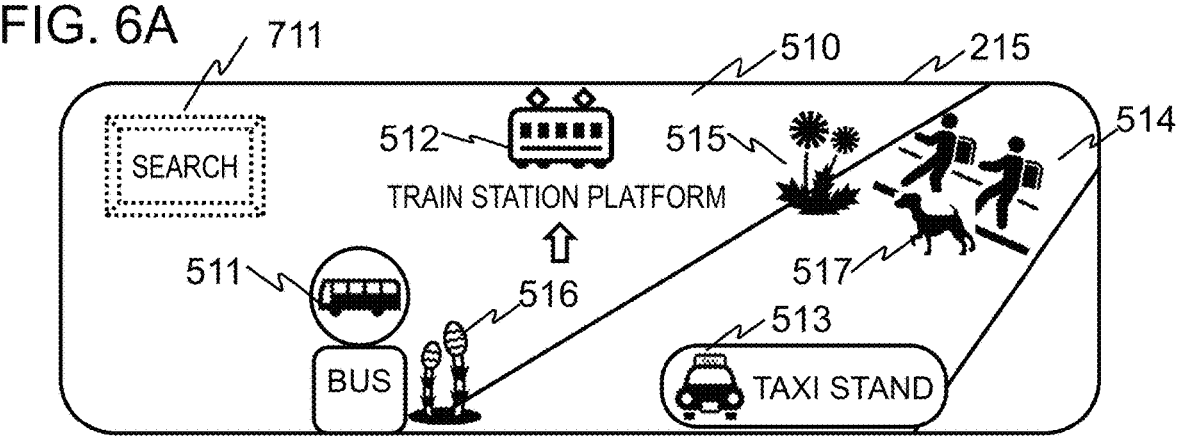
FIG. 6A to FIG. 6C explain the application control processing according to the first embodiment.

FIG. 6A illustrates what the user 201 sees through the display 215 in this case. As described above, the display 215 is a transmission type display, and thus the user 201 sees the image generated by the HMD 200 superimposed on a real image 510 in the real space. FIG. 6A illustrates the real image of the real space (real environment) by using a solid line while illustrating the image generated by the instruction reception display unit 221 by using a broken line. In FIG. 6A, the search instruction button 711 corresponds to the image generated by the instruction reception display unit 221.

The place illustrated in FIG. 6A is, for example, a square in front of a station. In the visual field range of the user 201, the following real objects in the real space exist, such as a bus stop including a bus figure 511, a guidance of a train station platform including a train figure 512, a signboard including a taxi figure 513, people 514, flowers 515, weeds 516, and a dog 517.

Figure 6B:
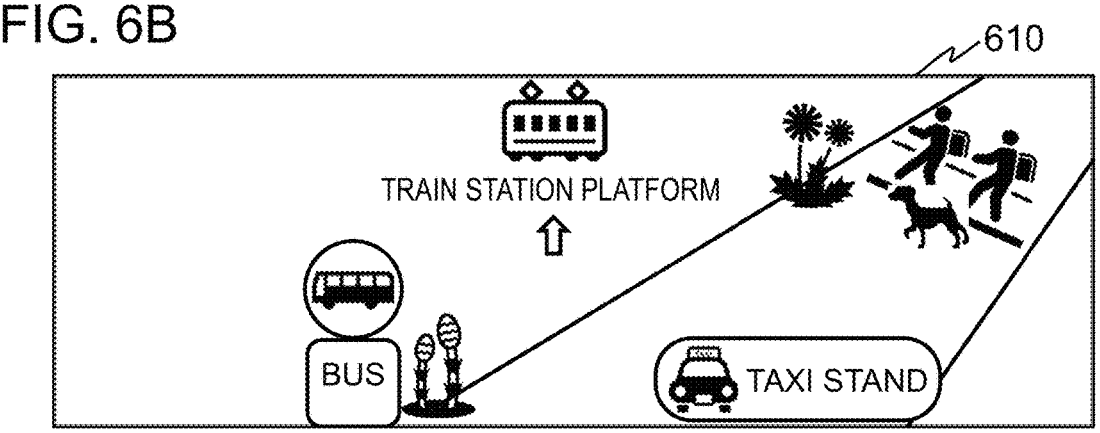

Upon receiving that the user 201 has selected the search instruction button 711 by means of the line of sight, the instruction reception display unit 221 causes the photographing processing unit 222 to acquire an image. A photographing visual field of the outward camera 214*a* is preset to include the actual visual field of the user via the display 215 of the HMD 200. FIG. 6B illustrates an image 610 acquired at this time.

Figure 6C:
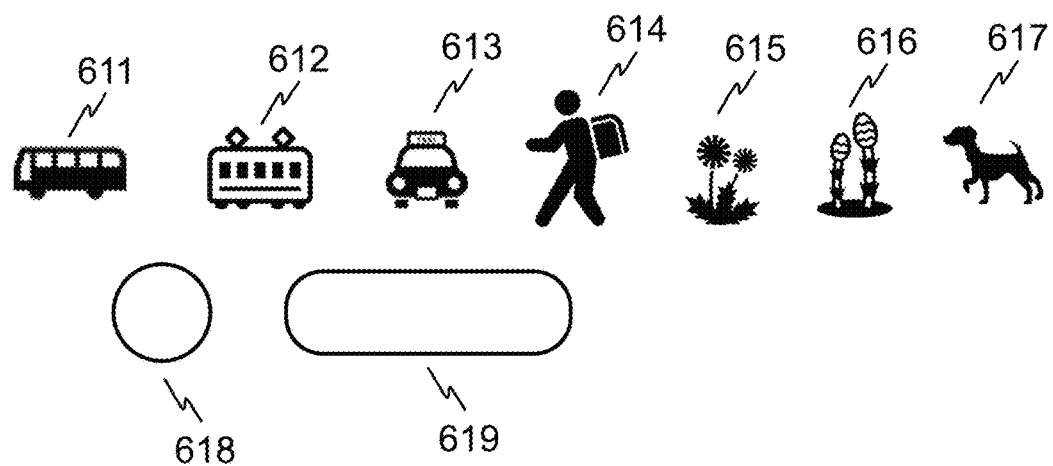

The image analysis unit 223 extracts objects from the image 610. FIG. 6C illustrates examples of the extracted objects. The objects extracted from the image 610 in which the environment above has been captured are, for example, a train figure 611, a bus figure 612, a taxi figure 613, a person figure 614, a flower figure 615, a weed figure 616, a dog figure 617, a circle 618, and an ellipse 619. The image analysis unit 223 refers to the icon DB 231 to determine whether each of the extracted objects is an icon.

That is, the image analysis unit 223 compares each object with each icon figure 231*b* registered in the icon DB 231, respectively, and determines whether a figure that matches or is similar to each object exists. When finding the similar figure 231*b* from among those registered in the icon DB 231, the image analysis unit 223 specifies the extracted object as the icon figure 231*b*.

In the example above, the image analysis unit 223 determines the bus figure 611, the train figure 612, and the taxi figure 613 as the icons, and specifies each icon ID 231*a* thereof, respectively.

Figure 7A:
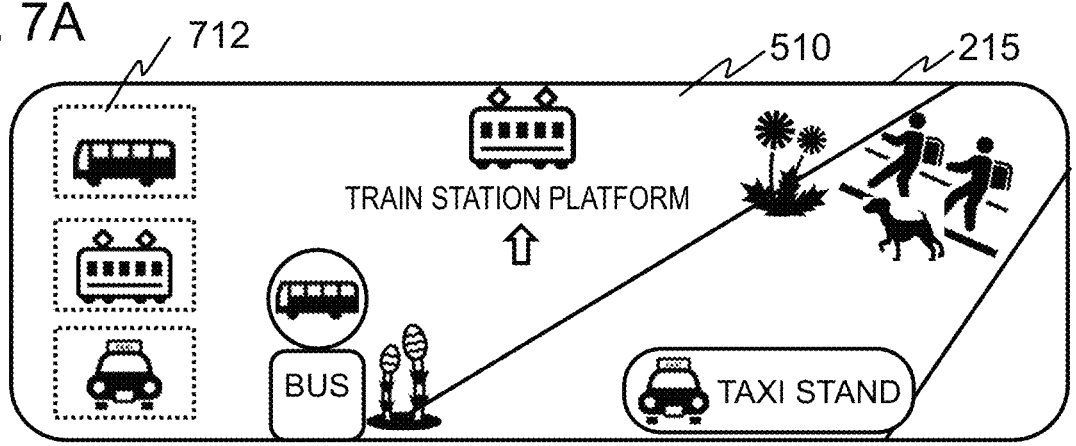
FIG. 7A to FIG. 7C explain the application control processing according to the first embodiment.

The instruction reception display unit 221 extracts each icon figure 231*b* of each specified icon from the icon DB 231 and generates a display icon 712 for each icon figure 231*b*. FIG. 7A illustrates a display example of the generated display icons 712 on the display 215. At this time, a display area for the display icon 712 is predetermined. The display area may be changed in accordance with an instruction from the user 201.

When receiving a selection instruction from the user 201, the app start unit 224 starts the application associated with the icon. In the present example, the user 201 selects the icon of the taxi figure, whereby the taxi dispatching application corresponding thereto is started.

Figure 7B:
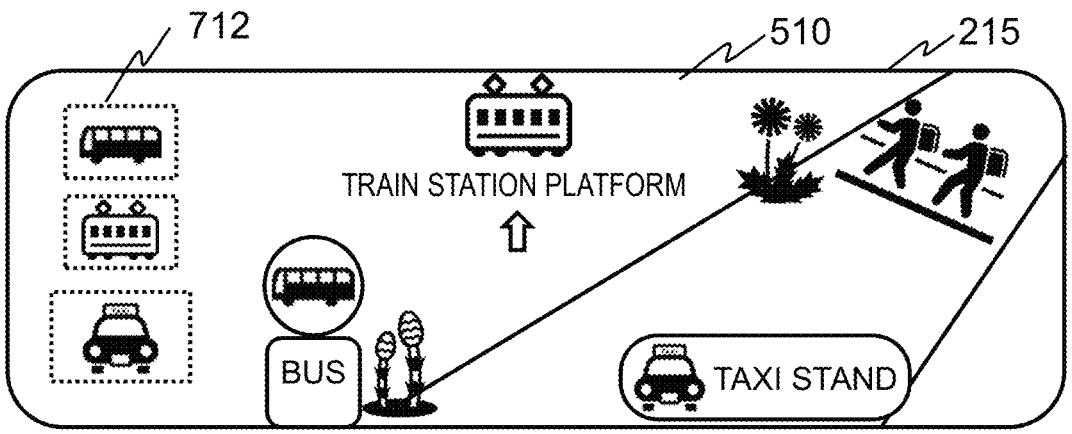

At this time, the instruction reception display unit 221 displays the display icon 712 that has been selected by the selection instruction in a display mode different from that of the other display icons 712. For example, as illustrated in FIG. 7B, the selected display icon 712 is displayed in a larger size than the other display icons 712.

Figure 7C:
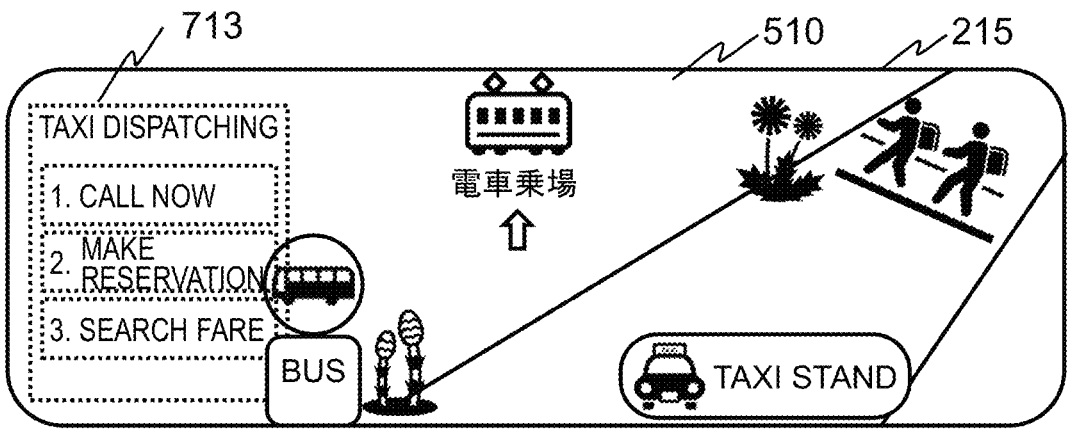

Thereafter, as illustrated in FIG. 7C, the instruction reception display unit 221 displays an initial screen data 713 of the started application on the display 215 in accordance with an instruction from the app start unit 224.

As described above, the HMD 200 according to the first embodiment is configured to analyze the image 233 captured by the outward camera 214*a* in accordance with an instruction from the user 201, extract real objects existing in the external field, and specify icons related thereto, respectively. Then, the HMD 200 starts the application associated with the specified icon. That is, in the first embodiment, an application is started simply by capturing a real object similar to an icon figure.

As described above, the first embodiment is configured to use various objects in the external field as if they were icons to start the applications corresponding thereto. Therefore, according to the first embodiment, it is possible to start the application that may be used with high possibility in the environment of the user 201 without involving an operation by the hand of the user 201. Since the HMD 200 of the first embodiment does not include the process of receiving selection of an icon from among many displayed icons, it is possible to provide the HMD 200 having high convenience and operability without disturbing the visual field of the user 201.

Furthermore, the present embodiment is configured to, when a plurality of icons of the applications that may be used with high possibility is specified in the environment of the user 201, display the plurality of icons above. That is, only the icons that may be used with high possibility are selectively displayed.

Generally, in the case of a terminal constructed based on such as a smartphone, a tablet terminal, or a personal computer, since all icons of the applications usable in the terminal are displayed, the user 201 needs to select an icon from among them. Accordingly, the display 215 displays many icons thereon.

On the other hand, according to the present embodiment, the display 215 displays only a minimum necessary icon. Therefore, even a display terminal of which a display space is small, such as the HMD 200, does not hinder the visual field of the user 201. In addition, it is possible to save the time and effort to search for a desired icon from many icons, thereby improving the usability. In this way, according to the first embodiment, it is possible to provide the HMD 200 having high visibility, high convenience, and high operability.

Furthermore, in the present embodiment, when the application requested by the user 201 is not registered in the HMD 200, the app acquisition unit 225 acquires the application from the server 300 and registers it in the HMD 200, thereby improving a probability of executing a desired application.

First Modification

In the first embodiment, the instruction reception display unit 221 receives an instruction from the user 201 by analyzing the line of sight of the user 201. Meanwhile, a method of receiving an instruction is not limited thereto. For example, sensing by the touch sensor 218*e* may be used to receive the instruction. When the user 201 moves a cursor and performs a selection operation within a display region of the display 215, for example, a double tap operation on the touch sensor 218*e*, the instruction reception display unit 221 recognizes and accepts that the display region is selected.

Figure 8A:
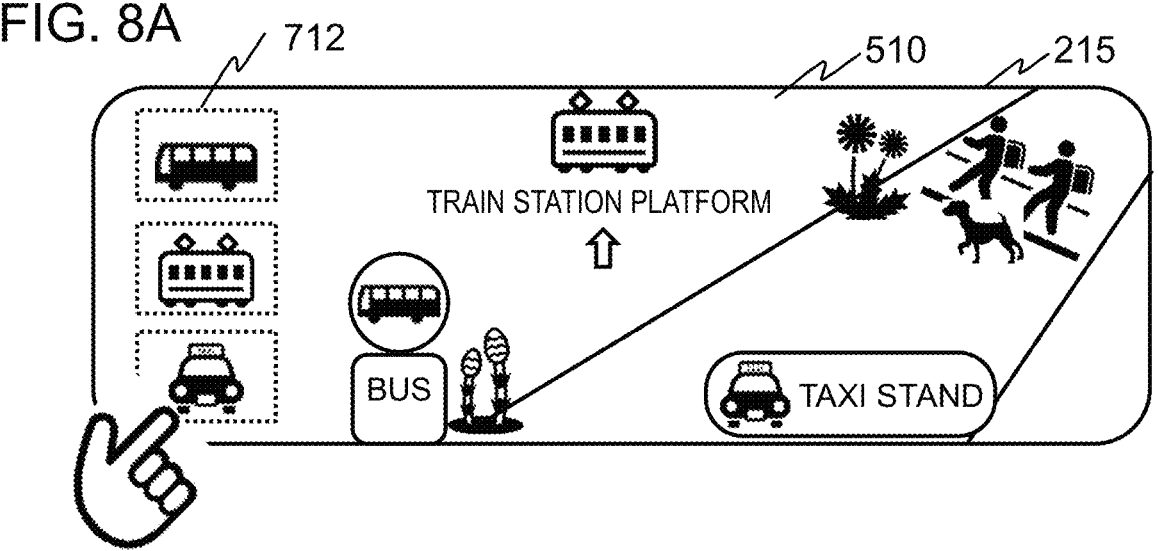
FIG. 8A explains an instruction method by a user according to a first modification of the first embodiment, FIG. 8B explains an icon display example according to a second modification of the first embodiment, and FIG. 8C explains an instruction method at the time of start of an application according to a fifth modification of the first embodiment.

As illustrated in FIG. 8A, the instruction reception display unit 221 detects the movement of the finger of the user 201 by using the outward camera 214*a*. When detecting a gesture operation as the movement of the finger, the instruction reception display unit 221 may determine that the display icon 712 is selected. The gesture operation includes, for example, an operation as if touching, clicking, or pinching a region on which the display icon 712 is displayed. The operation as if toughing may be performed by overlapping the finger with the display icon 712 on the line of sight, or touching a real object.

Second Modification

Figure 8B:
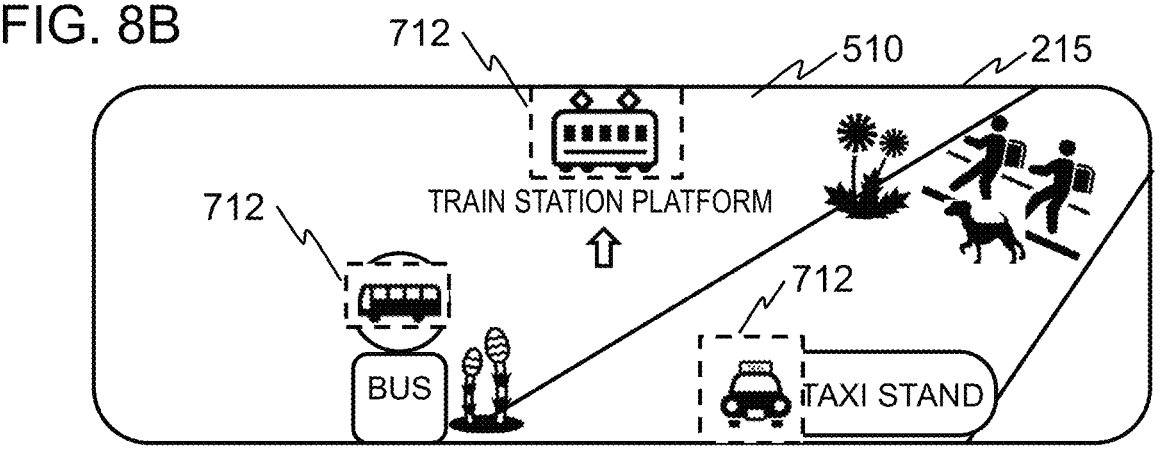

In the first embodiment, as illustrated in FIG. 7A, each display icon 712 is displayed on a predetermined region of the display 215. Meanwhile, a display position of each display icon 712 is not limited thereto. For example, as illustrated in FIG. 8B, the instruction reception display unit 221 may display, on the display 215, each display icon 712 as if it was a virtual object, at a position of the corresponding real object in the actual visual field of the user 201.

At this time, it may be configured that a display mode of the display icon 712 of the icon of which the corresponding application is stored in the storage device 230 is made different from a display mode of the display icon 712 of the icon that is not stored therein.

Furthermore, the icon figure 231*b* is not necessarily displayed as the display icon 712. It may be configured to display an indication on a region of an object determined as an icon on the display 215 so as to indicate that the object is determined as the icon. For example, a dotted line frame may be displayed on the position of the object.

Third Modification

The display icon 712 may be displayed in a switchable manner between a display mode and a non-display mode in accordance with an instruction from the user 201. In the case of not displaying the display icon 712, the user 201 may perform a selection operation by using a region itself corresponding to a real object as an icon to start the application corresponding thereto. In this case, the instruction reception display unit 221 specifies the icon based on the object in the image region selected by the user 201 by analyzing an image in which the visual field range is captured, and receives the instruction. Furthermore, in the case of determining that recognition of the external field is disturbed by the display icon 712, the instruction reception display unit 221 may prohibit the display icon 712 from being displayed. In this case, the instruction reception display unit 221 acquires an image of a region corresponding to the actual visual field before displaying the display icon 712, causes the image analysis unit 223 to analyze the image, and determines whether recognition of a real object group of the external field is disturbed by the display icon 712. Furthermore, in accordance with an analysis result of the image analysis unit 223, the instruction reception display unit 221 may adjust a display position of the display icon 712 so as to display the display icon 712 in a region in which recognition of the real object group of the external field is not disturbed as much as possible.

Fourth Modification

Figure 9A:
FIG. 9A to FIG. 9C explain an object according to a fourth modification of the first embodiment, and FIG. 9D to FIG. 9F explain display examples after specifying an icon according to the fourth modification of the first embodiment.
Figure 9B:
Figure 9C:
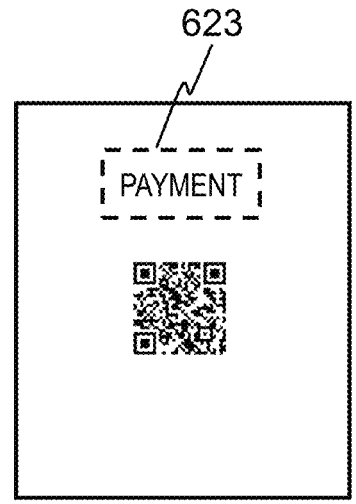

In the first embodiment, the image analysis unit 223 extracts a figure as an object from the acquired image 233 within the actual visual field of the user 201. Meanwhile, the object to be extracted is not limited to a figure. For example, it may be a character string indicated on a signboard. FIG. 9A to FIG. 9C illustrate examples of character strings 621, 622, 623 to be extracted as objects.

Extraction of a character string is performed by an existing technique, for example, OCR. Then, the image analysis unit 223 analyzes the meaning of the extracted character string. Analysis of the meaning of the character string is performed by an existing technique, for example, morphological analysis. Then, the image analysis unit 223 compares the analyzed meaning with the content 231*d* in the icon DB 231 to determine whether an icon corresponding thereto exists. That is, when the meaning obtained by the analysis matches the content 231*d* with a predetermined accuracy, the image analysis unit 223 determines the icon having the content 231*d* as a related icon.

Figure 9D:
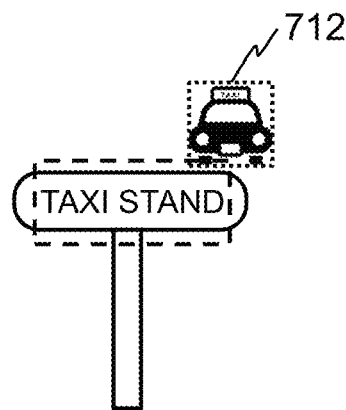
Figure 9E:
Figure 9F:
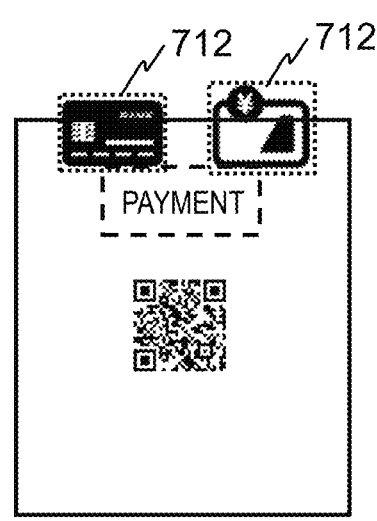

When an icon related to the extracted character string is specified, the image analysis unit 223 may extract the icon figure 231*b* of the icon, and cause the instruction reception display unit 221 to display it on the display 215 as the display icon 712. A display position thereof is near the character string in the actual visual field. FIG. 9D to FIG. 9F illustrate display examples of the display icon 712 on the display 215. FIG. 9F illustrates an example in which a plurality of icons is specified as related icons. In this case, each icon figure 231*b* of all the specified icons is displayed.

In the fourth modification, since an object to be extracted is not limited to a figure, a region corresponding to an icon can be extracted from a wide range in the actual visual field of the user 201. As a result, a probability of executing a desired application increases, thereby improving the convenience for the user 201.

Fifth Modification

In the first embodiment, when the number of icons is one, the app start unit 224 automatically starts the application corresponding thereto. Meanwhile, the present invention is not limited thereto. For example, it may be configured that the instruction reception display unit 221 receives an instruction (execution instruction) of execution from the user 201 before start of the application. That is, prior to step S1109, the instruction reception display unit 221 receives the execution instruction, and then the app start unit 224 starts the application.

Figure 8C:
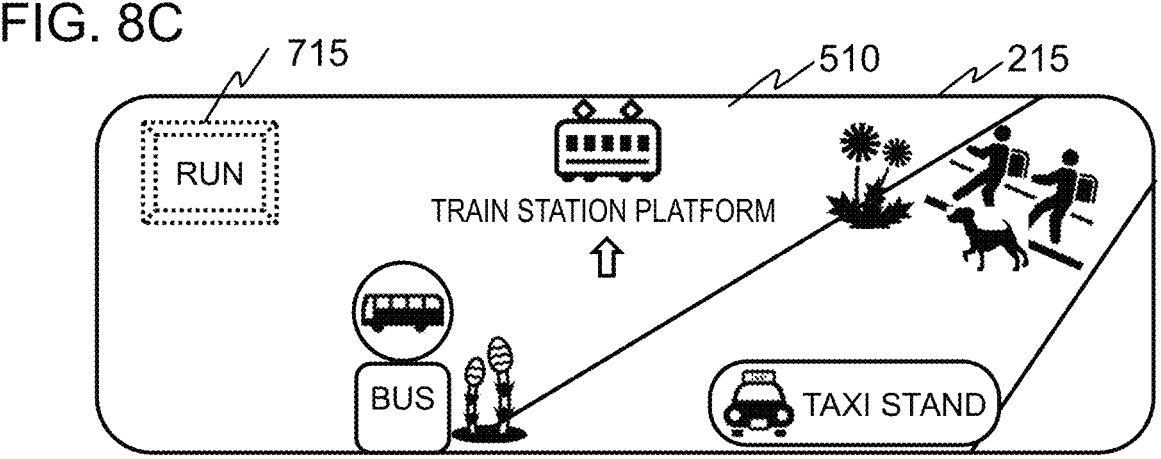

At this time, as illustrated in FIG. 8C, the instruction reception display unit 221 displays, on a predetermined region of the display 215, for example, an instruction button 715 for receiving the execution instruction. Then, the instruction reception display unit 221 receives selection of the instruction button 715 by means of a line of sight as the execution instruction.

In the fifth modification, since the instruction reception display unit 221 receives the execution instruction from the user 201 before start of the application, it is possible to reduce unnecessary start of the application.

The app start unit 224 may be configured to, when automatically starting the application, receive an instruction from the user 201 to abort (abort instruction) the start or an operation of the application halfway after the automatic start. As the abort instruction, for example, the gesture operation by the user 201 which was described with reference to FIG. 8A can be used. The gesture operation may include an operation such as waving the hand or shaking the head.

Furthermore, it may be configured to release unintended display by the gesture operation above. For example, there is a case where the search instruction button 711 is unintentionally selected by the line of sight of the user 201. At this time, the display icon 712 and the initial screen data 713 to be displayed thereafter are unintended. In such a case, when receiving the abort instruction, the instruction reception display unit 221 stops the application control processing and restores the original screen.

Furthermore, when it is configured to set automatic start of the application without receiving the execution instruction, depending on the type of the application, start prohibition may be set in advance. Specifically, a flag indicating the prohibition of start is set in a record of the corresponding application in the app DB 232. When the start prohibition is set, the app start unit 224 does not start the application in step S1109 and notifies, for example, the user 201 that the start prohibition has been set.

Sixth Modification

In the first embodiment, one application is made associated with one icon ID 232a in the app DB 232. Meanwhile, the present invention is not limited thereto. For example, a plurality of applications may be associated with one icon ID 232a.

Figures 10A, 10B:
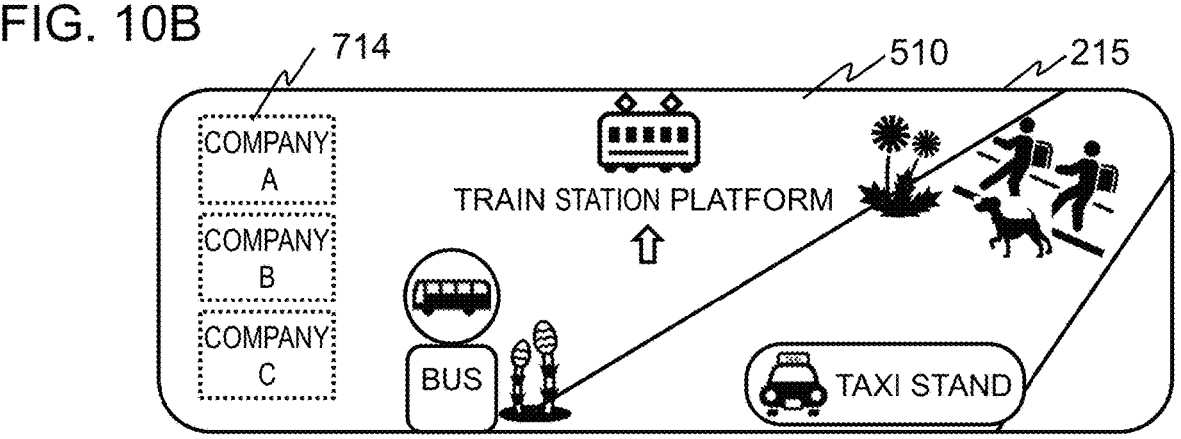
FIG. 10A explains an application database according to a sixth modification of the first embodiment, and FIG. 10B explains a display example according to the sixth modification.

FIG. 10A illustrates an example of the app DB 232 in which the icon of the taxi figure (icon ID 232a is taxi 01) is associated with the plurality of taxi dispatch applications for each taxi company, respectively.

In this case, the app start unit 224 outputs, to the instruction reception display unit 221, information of all applications associated with the icon ID 232a of the icon that has been selected by the selection instruction. For example, the app start unit 224 outputs the app name 232b. Upon receiving this, as illustrated in FIG. 10B, the instruction reception display unit 221 generates image data (application icon; app icon) 714 capable of specifying the associated applications, and displays the generated image data on the display 215.

The instruction reception display unit 221 receives an instruction for selecting one of the app icons 714 from the user 201. Then, the app start unit 224 starts the selected application.

In the case where a plurality of applications is associated with one icon ID 232a, it may be configured to set priorities for the plurality of applications and display the app icons 714 in descending order of the priories. In this case, the priories are registered in advance in the app DB 232.

When the priories are set, the instruction reception display unit 221 may determine that the application having the highest priority is selected without waiting for the selection instruction from the user 201.

When the application corresponding to the selected icon is not registered in the app DB 232, the app acquisition unit 225 acquires the application from the server 300 in the manner as described above. At this time, on the server 300 as well, a plurality of applications may be prepared for one icon. In this case, it may be configured that, before downloading, the instruction reception display unit 221 displays information for specifying each application on the display 215 to receive a selection instruction from the user 201.

When the app acquisition unit 225 acquires an application from the server 300, there is a case where no application is associated with the transmitted icon ID 232a. In this case, an Artificial Intelligence (AI) function on the server 300 may select a predetermined number of highly relevant (adaptable) applications in order of relevance (adaptability).

The app icons 714 of the selected application as a result above may be displayed in descending order of adaptability. In this connection, they may be displayed in order of popularity. Upon receiving the selection instruction from the user 201, the app acquisition unit 225 downloads the selected application from the server 300.

Seventh Modification

The application control system according to the first embodiment may be configured to cooperate with other functions provided in the HMD 200 to reduce the number of display icons 712 or the number of app icons 714. In addition, it may be configured to reduce the number of icons to be collated to reduce the processing load on the image analysis unit 223. As a result, the processing speed can be increased, and the probability of specifying the icon or the desired icon can be increased.

For example, it may be configured to set a limitation on icons to be searched in the icon DB 231 depending on a state of the user 201. In this case, firstly, the image analysis unit 223 extracts an object from the image by the method described above. At the time of determining whether the extracted object is an icon, the image analysis unit 223 collates it only with the icon figure 231b of the icon having the type 231c or the content 231d that matches the situation.

For example, in the case of the HMD 200 having a schedule management function, information therein may be used. When the schedule management function indicates that the user intends to take a ride on a train, the image analysis unit 223 refers to the content 231d or the type 231c to extract only the icon figure 231b of a train-related icon for collation. The train-related icon is, for example, an icon registered as being related to a train in the content 231d or an icon of which the type 231c is traffic. In this connection, the image analysis unit 223 acquires schedule information from the schedule management function, and specifies a collation range by semantic analysis.

Furthermore, for example, in the case of the HMD 200 having a function of accumulating a processing history, the information therein may be used. Still further, in the case of the HMD 200 having a function of making the processing history associated with the location information at the time of processing and accumulating it, the information therein may be used. The information above may be used in combination with the schedule information.

For example, when it is recorded as a history that the user 201 paid by electronic money at a specific store, the image analysis unit 223 uses this information to limit the collation range. As the information for specifying the store, the location information of the store is used. The location information of the store is acquired by the GPS receiver 218a serving as a location information acquisition device.

That is, when the current position of the HMD 200 is the store, the image analysis unit 223 collates the extracted object with only the icon figure 231b related to the electronic money in the icon DB 231, for example, an icon of which information indicating electronic money is registered in the content 231d, or an icon of which information indicating settlement is registered in the type 231c.

When it is recorded that the user 201 paid by specific electronic money at a specific store and when the user 201 turns on the search mode in the store, the app start unit 224 may directly start the application related to the specific electronic money. The app start unit 224 receives the location information and a search instruction via the instruction reception display unit 221.

In addition to the current location information, in the case where the information on what kind of place the current position is can be obtained, it may be configured to limit a range from which icons are extracted in accordance with the information.

For example, when the current position is an administrative facility, the search range of the image analysis unit 223 is limited only to icons related to the administrative service. When the current position is a transportation facility, the search range of the image analysis unit 223 is limited only to icons related to the traffic.

With the configuration above, even when a real object similar to an icon is inadvertently captured, the inadvertently captured object is not extracted as the icon. In this connection, the information on what kind of place the current location information is, for example, is determined by using current location information from the GPS receiver 218a, current location information obtained by a mobile communication function of the communication I/F 217, or map information.

The application control system according to the first embodiment may be configured to cooperate with other databases. For example, as illustrated in FIG. 11, it may be configured to hold applications that can be used for every store as a database (store DB 235) in advance, and reduce the number of icon figures 231b to be collated by using the store DB 235.

In the store DB 235, for each store, the location information and the app IDs 232c or icon IDs 232a of the applications that can be used therein are registered. FIG. 11 illustrates an example in which the icon IDs 232a are registered. When the current location information acquired by the GPS receiver 218a of the HMD 200 matches the location information of the store, the image analysis unit 223 determines that the user 201 is in the store. Then, the image analysis unit 223 limits a matching range to the available icon IDs 232a registered in the store DB 235.

In the case provided with the store DB 235, when the search mode is turned on in a state where it is determined that the user 201 is in the store, the instruction reception display unit 221 may extract the icon figures 231b of the icon ID 232a registered in the store DB 235 from the icon DB 231 and display all the extracted icon figures 231b on the display 215 instead of making the image analysis unit 223 analyze an image.

In addition, priorities of the usable applications may be set for each store in the store DB 235. In this case, when the search mode is turned on in the store, the instruction reception display unit 221 may cause the app start unit 224 to start the application having the highest priority among the applications registered in the HMD 200.

Particularly, when the seventh modification is applied to the application control processing such as payment, for example, even when the HMD 200 holds the applications of the icons corresponding to each of the real objects existing in the real visual field, an icons that is not related to payment is not displayed. As a result, since selection candidates are limited to only more relevant ones, it is possible to improve the usability for the user.

The seventh modification is applicable when a plurality of icons of the same type is displayed and one of them is selected in accordance with a predetermined rule. The predetermined rule includes, for example, a past usage frequency and a predetermined priority order.

Eighth Modification

In the case where an auxiliary code such as a QR code (registered trademark) is arranged near the object corresponding to the icon, the auxiliary information provided by the auxiliary code may be used to reduce the processing load of the app control unit 220. For example, it may be configured to acquire an application in accordance with the information of the auxiliary code. Hereinafter, an example in which the auxiliary code is a QR code will be described.

In the present embodiment, when the object extracted by the image analysis unit 223 is determined as the icon, the image analysis unit 223 further refers to the auxiliary information of the QR code near the object in the image 233.

When a QR code is not arranged in the image, the image analysis unit 223 does not need to perform this processing. When a plurality of QR codes is arranged in the image, for each object, the QR code closest (nearest) to the object in the image is determined as the QR code of the object.

Then, the image analysis unit 223 acquires information (hereinafter, referred to as QR information) from the specified QR code, performs the processing in accordance with the QR information, and displays the result.

For example, when a URL is registered in the QR information as a storage location of the relevant application, the image analysis unit 223 notifies the app acquisition unit 225 of the URL via the app start unit 224. The app acquisition unit 225 accesses the URL through the communication I/F 217, acquires the application from the server 300 having the URL, and starts the acquired application. It may be configured to convert the QR information itself into a text and display it on the display 215.

Figure 12A:
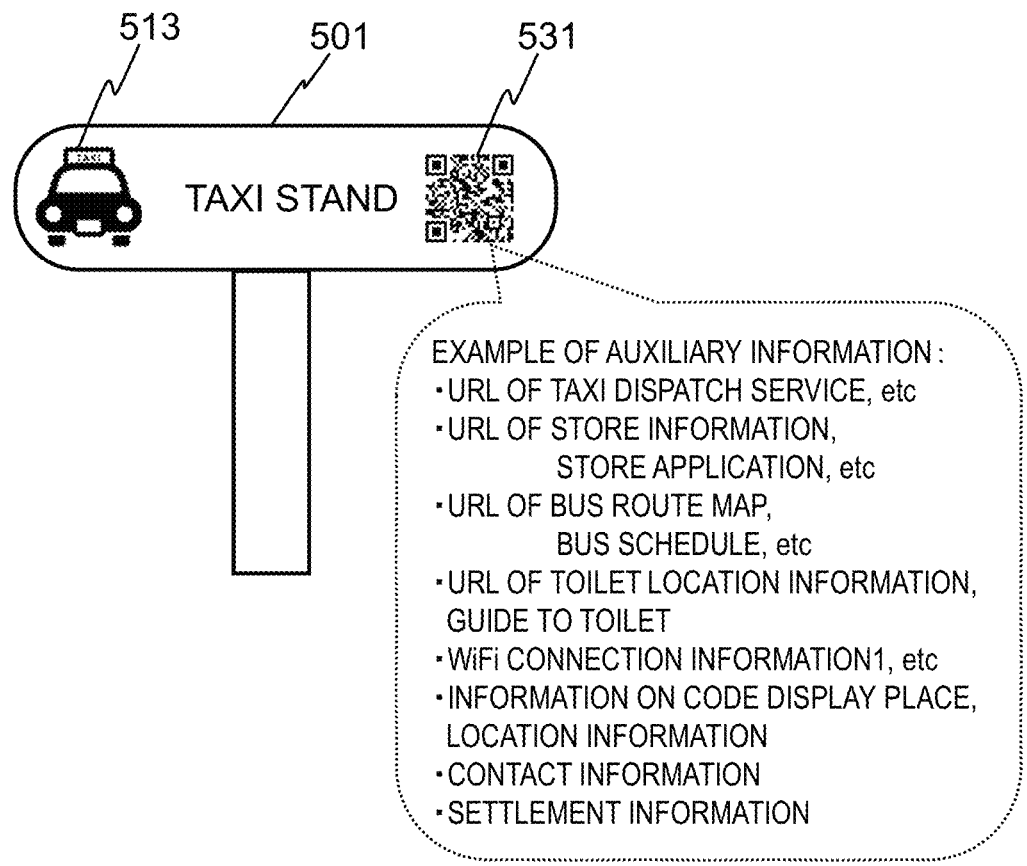
FIG. 12A and FIG. 12B explain eighth modification of the first embodiment.

For example, FIG. 12A illustrates an example in which a QR code 531 is arranged on the signboard 501 on which the taxi figure 513 is shown. The image analysis unit 223 specifies a region corresponding to the taxi figure 513 as the icon based on the image 233 in which the visual field is captured. Thereafter, the closest QR code is specified in the image 233, and the information thereof is acquired and used as described above.

As illustrated in FIG. 12A, for example, the QR code arranged on the signboard 501 at the taxi stand records therein URL information of a company providing a taxi dispatch service, URL information of a taxi dispatch application, location information indicating a taxi dispatch designated location, and telephone number information of a taxi dispatch center.

A QR code arranged near an icon of which the type 231c is shopping records therein, for example, URL information of an online store application, URL information providing store information, goods information of a store, and settlement information at the time of payment.

A QR code arranged near a route bus figure records therein, for example, URL information of a site providing bus route information, bus stop information, and fare information, URL information of a site providing operation information in real time, and URL information of a site providing a transfer guide.

A QR code arranged near a toilet figure records therein, for example, a location of a public toilet, and URL information of a site providing a guide from the current position to the nearest public toilet. The QR codes above are provided in, for example, a large-scale store and a shopping mall.

In addition to the auxiliary information obtained by the QR code, as described in the first embodiment, the app start unit 224 may refer to the app DB 232 to start the application which has been associated with the icon and registered in the app DB 232.

The auxiliary information may also be used in the processing of the started application.

In this case, the started application performs predetermined processing together with or based on the read auxiliary information, thereby making it possible to automate complex processing, for example, by using the auxiliary information obtained from a QR code as a parameter at the time of execution of the application. Since the auxiliary code is used in addition to the processing operation by the application, it is possible to achieve the processing which is desirable for the user 201 of the HMD 200.

Figure 12B:
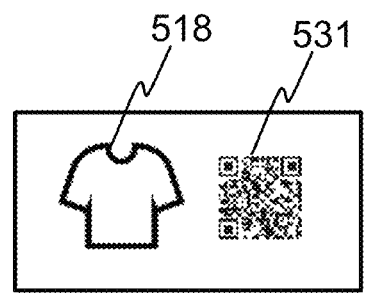

FIG. 12B illustrates an example in which a mark 518 and the QR code 531 are arranged on a tag attached to the clothes. Here, it is assumed that the mark 518 is associated with the application for an online store that sells clothes. It is also assumed that the QR code 531 records therein, as the auxiliary information, the information for specifying such as a maker code, product number, color, and size.

At the time of start of the application, the auxiliary information is acquired so that the user can automatically order the same item as the clothes above in the online store. In addition, the user can search the items which are the same as the clothes above but have different colors and sizes.

Figure 13A:
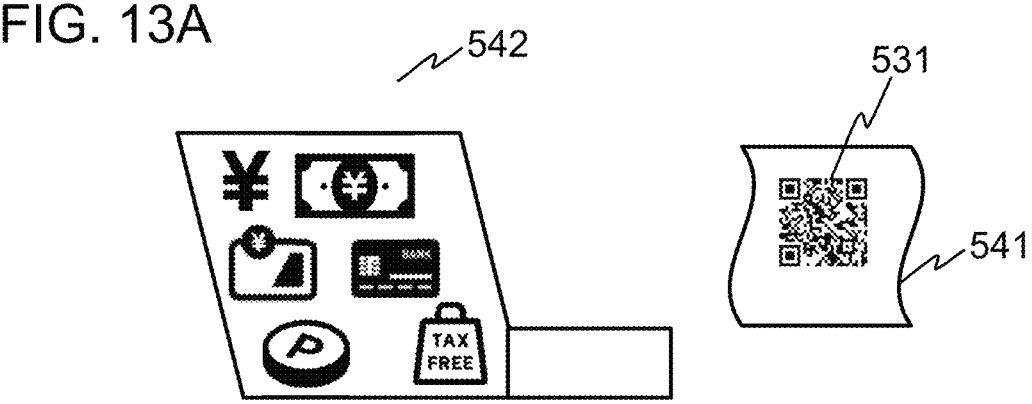
FIG. 13A to FIG. 13C explain application control processing according to the eighth modification of the first embodiment.

As illustrated in FIG. 13A, generally, marks of usable credit cards, marks of usable electronic money, and marks of other usable settlement means are arranged near an accounting register 542 of a store. In such an area, the QR code 531 provided on a receipt 541 may be used. The QR code 531 above records therein, as the auxiliary information, information necessary for settlement such as the total purchase amount, store information, purchased item information, and settlement institution. By using the auxiliary information recorded in the QR code 531, the settlement application which has been started by a selection instruction of the icon can proceed with the settlement processing. In this connection, the QR code may be displayed on a display terminal such as a tablet instead of the receipt 541. Furthermore, the marks of usable credit cards, the marks of usable electronic money, and the marks of other usable settlement means may be displayed on the display terminal.

In this connection, capturing an image of the receipt 541 may be performed separately from capturing an image of the visual field range. In this case, after starting the application corresponding to the icon which has been extracted and specified from the image of the visual field range of the user 201, the app control unit 220 captures the image of the receipt 541, acquires the auxiliary information of the QR code 531, and reflects the acquired information on the processing of the application.

In the above, the example in which the image analysis unit 223 also functions as a QR code reader has been described. Meanwhile, a function of the QR code reader may be provided separately from the image analysis unit 223. In this case, after specifying the QR code, the image analysis unit 223 provides the reader function with an instruction to read the QR code.

Furthermore, in the example above, reading the QR code is automatically performed. Meanwhile, it may be configured to read the QR code only when receiving an instruction from the user 201. In this case, the instruction reception display unit 221 receives the instruction from the user 201, and provides the image analysis unit 223 or the reader function with the instruction to read the QR code. For example, the instruction reception display unit 221 determines the presence of the selection instruction when the line-of-sight direction of the user 201 corresponds to a direction of the QR code on the image displayed on the display 215.

In the example above, each of the object and the QR code is independent. Meanwhile, a QR code with an icon in which an icon figure is combined with an auxiliary code (QR code) may be employed.

In the case where the QR code with an icon is used, the image analysis unit 223 determines that the extracted object is the icon without performing the processing of determining whether it is the icon, and acquires the auxiliary information recorded in the QR code. Then, the subsequent processing is performed in accordance with the auxiliary information.

Figure 13B:
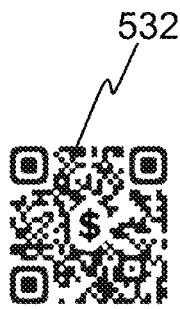

FIG. 13B illustrates an example of a QR code 532 with a settlement icon. In FIG. 13B, the QR code records therein that the type of the icon figure is settlement, and further records, for example, settlement means that can be used.

Figure 13C:
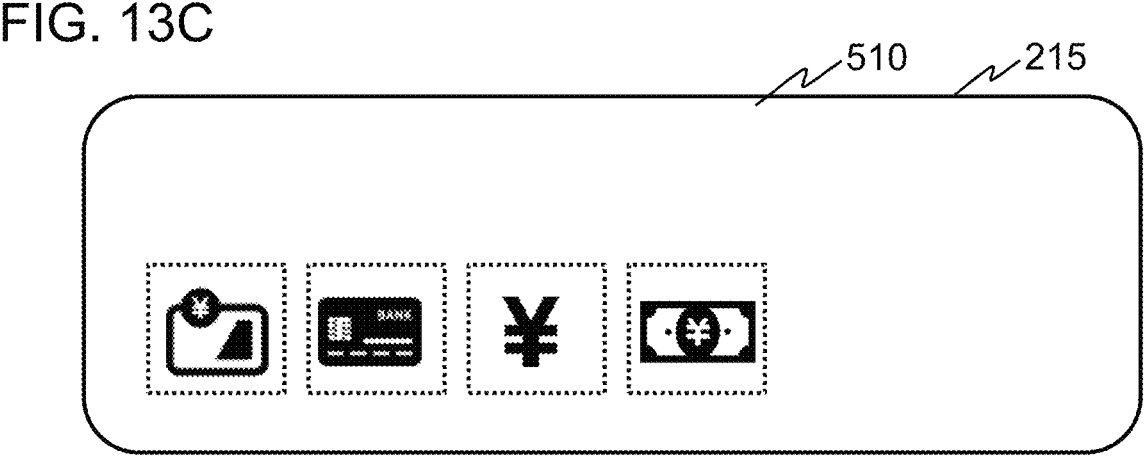

The image analysis unit 223 analyzes the image to acquire these pieces of information. Then, the image analysis unit 223 accesses the icon DB 231, extracts all icon figures each of which the type 231c is settlement, and displays them on the display 215 as illustrated in FIG. 13C. The subsequent processing is the same as that of the first embodiment.

In the example above, the settlement icon figure has been described, meanwhile, the eighth modification is not limited to thereto. The eighth modification can be applied to various services and processing such as transportation, commerce, and administrative services.

Ninth Modification

In the above-described embodiment and modifications, the HMD 200 itself includes the icon DB 231, and the image analysis unit 223 refers to the icon DB 231 to determine whether the extracted object is the icon. Regarding an application, similarly, the HMD 200 itself includes the app DB 232, and the application is started in accordance with the app storage location 232d in the app DB 232.

Meanwhile, the HMD 200 itself does not necessarily include the icon DB 231 and the app DB 232. Instead of the icon DB 231, the server 300 may include an icon bank 311 in which various icon figures are registered. Furthermore, the HMD 200 may be configured to constantly acquire an application from the server 300 while not being provided with the app DB 232.

Figure 14:
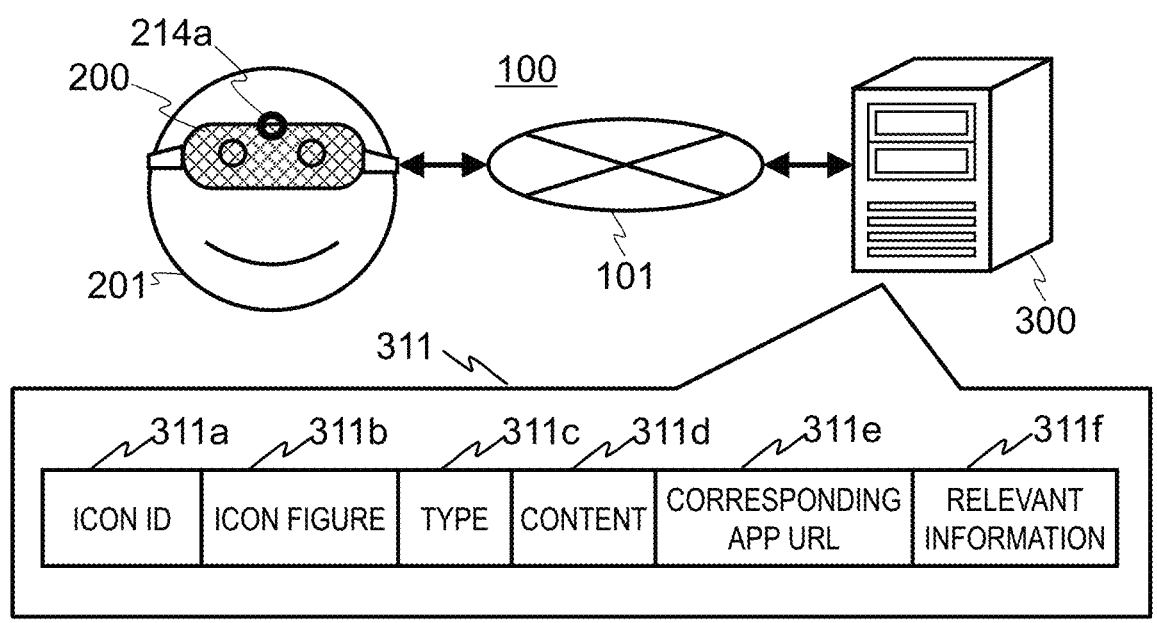
FIG. 14 is a system configuration diagram of a ninth modification according to the first embodiment.

In this case, as illustrated in FIG. 14, each icon registered in the icon bank 311 includes an icon ID 311a, an icon figure 311b, a type 311c, and a content 311d. In addition, in each icon, URL information (corresponding app URL 311e) of an application corresponding to the icon and relevant information 311f are registered.

The type 311c is information classified by the type of an icon in the same manner as the icon DB 231 described above, and indicates, for example, traffic and settlement. The icon ID 311a is information for uniquely identifying each icon. The corresponding app URL 311e is access information to the application associated with the icon. The relevant information includes, for example, information of a registration source of the icon and information of a right source thereof.

The server 300 in which the icon bank 311 is registered may be a device different from the server 300 in which an application is registered.

In this case, in the process of specifying an icon in step S1103, the image analysis unit 223 accesses the icon bank 311 of the server 300 via the communication I/F 217 and performs collation to specify the icon. Then, the image analysis unit 223 downloads the icon ID 311a and the icon figure 311b of the specified icon onto the HMD 200 and displays the downloaded icon figure 311b on the display 215 to receive a selection instruction. At this time, the image analysis unit 223 also downloads other information (for example, type 311c, content 311d, corresponding app URL 311e) associated with the icon.

The instruction reception display unit 221 notifies the app acquisition unit 225 of the information of the selected icon. Then, in accordance with the corresponding app URL 311e associated with the selected icon, the app acquisition unit 225 accesses the URL, and downloads and starts the corresponding application.

In the process of determination of whether the extracted object is the icon, when the collation range is limited to only the icon DB 231, the processing speed becomes fast. On the other hand, in the case of using the icon bank 311, since the image analysis unit 223 accesses the server 300 via the network 101, the overall processing speed is reduced while a probability of specifying the icon can be improved.

As described above, in the ninth modification, since various icons and relevant information are registered in the icon bank 311, when the icon is used for the first time, it is possible to recognize the above and then use the relevant application. As a result, it is possible to further improve the convenience.

It may be configured to register an application itself in the icon bank 311.

In addition, the ninth modification may be combined with the first embodiment. That is, after extracting an object, firstly, the image analysis unit 223 accesses the icon DB 231. Then, when an icon corresponding to the extracted object is not registered in the icon DB 231, the image analysis unit 223 accesses the icon bank 311 of the server 300 for collation. When downloading the data such as an icon figure from the icon bank 311, the image analysis unit 223 additionally registers it in the icon DB 231.

As a result, even in the case where the icon DB 231 is not satisfactory, when an object similar to an icon existing in the world can be extracted from the image 233, an application associated with the icon can be started. That is, regarding an icon that is not widely used in general, the user 201 does not have to register it in advance, thereby further improving the convenience.

It may be configured to, when the icon figure 311b that matches the extracted object is not registered in the icon bank 311, determine that no icon is similar to the object extracted from the image 233, display the determination result above on the display 215, and abort the processing. In addition, it may be configured to notify the user 201 of the determination above or the like.

The present modification uses the icon bank 311, and accordingly, various objects existing in the real world can be registered as icons, and can be used by classifying them and providing them with meanings. Alternatively, even in the case where the object has not been provided with the meaning, the meaning can be predicted based on, for example, its shape and arrangement location, and provided thereto.

Second Embodiment

Next, a second embodiment of the present invention will be described. The HMD 200 according to the first embodiment is configured to display an icon and the like on the display 215 thereof. Meanwhile, the HMD 200 according to the second embodiment is configured to further cooperate with a portable terminal and display an icon and the like on a display of the portable terminal.

In the second embodiment, the HMD 200 wirelessly communicates with the portable terminal at the hand of the user 201 through such as Wi-Fi or Bluetooth (registered trademark) to transmit, to the portable terminal, the icon figure specified by the HMD 200 and the data of the initial screen of the started application. The portable terminal displays the received icon figure and the initial screen on the display of the portable terminal.

Figure 15A:
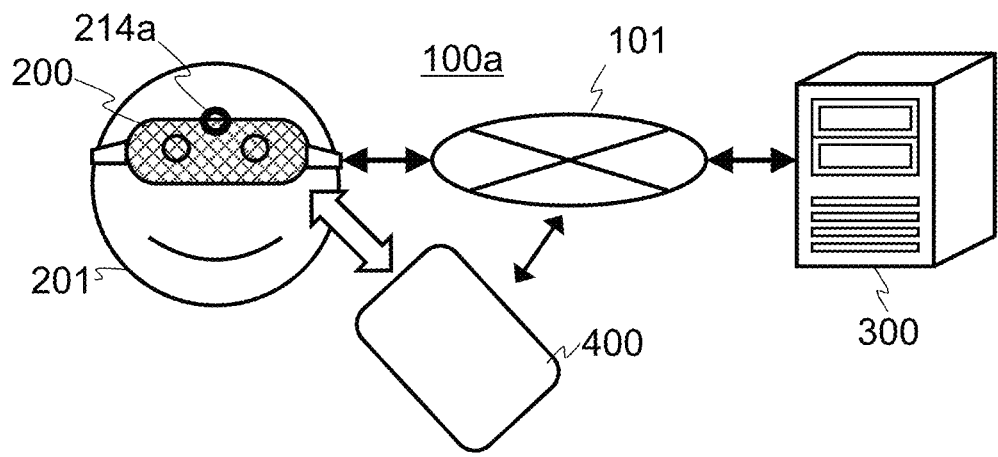
FIG. 15A is a system configuration diagram of a second embodiment.

Firstly, a system configuration of an application control system 100a according to the second embodiment will be described. FIG. 15A is a system configuration diagram of the application control system 100a according to the second embodiment. The application control system 100a of the second embodiment includes the HMD 200, the server 300, and a portable terminal 400.

In the same manner as the first embodiment, the HMD 200 and the server 300 are connected to each other via the network 101. The configurations and functions thereof are the same as those of the first embodiment.

As described above, in the second embodiment, the HMD 200 and the portable terminal 400 transmit and receive data therebetween by near field communication. Accordingly, the communication I/F 217 of the second embodiment includes a LAN (Local Area Network) communication I/F and a near field communication I/F.

The LAN communication I/F is an interface that is wirelessly connected to a network through an access point (AP) device by using Wi-Fi (registered trademark) or the like, and transmits and receives data to and from other devices on the network.

The near field communication I/F transmits and receives data wirelessly to and from a device including a wireless communication device. The near field communication I/F realizes, for example, simple information exchange between information devices within a distance of several meters to several tens of meters, by using radio waves through Bluetooth. Furthermore, the near field communication I/F is, for example, an I/F of near field communication (NFC), which may realize bidirectional communication between devices provided with NFC chips within an extremely short distance of several centimeters to approximately one meter. The near field communication I/F is applicable, for example, to a service using a non-contact IC chip such as electronic money provided in a main body of the portable terminal.

Furthermore, the instruction reception display unit 221 receives an instruction from the portable terminal 400 via the communication I/F 217.

The portable terminal 400 is an information processing apparatus having a communication function and a display device, for example, a smart phone or a tablet terminal. The portable terminal 400 may be a wearable device such as a watch. In the case of the wearable device, its system can be built only with wearable equipment together with the HMD 200, thereby making it possible to maintain the benefit of not occupying the user's hand. In the second embodiment, the portable terminal 400 is connected to the HMD 200 by near field communication. The near field communication is performed through such as Wi-Fi or Bluetooth. The mobile terminal 400 is further connected to the network 101.

Figure 15B:
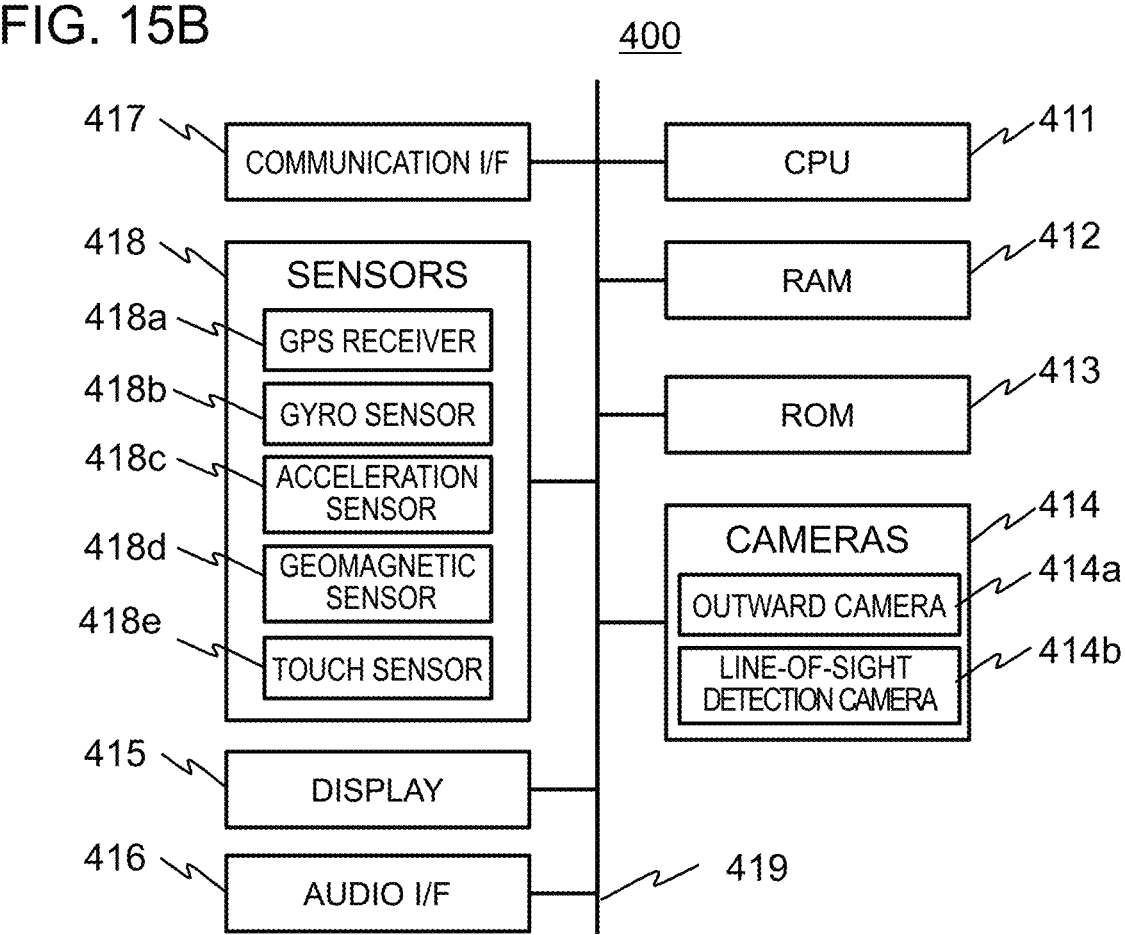
FIG. 15B is a hardware configuration diagram of a portable terminal according to the second embodiment.

FIG. 15B is a hardware configuration diagram of the mobile terminal 400 according to the second embodiment. The HMD 200 of the second embodiment basically has the same configuration as that of the HMD 200 illustrated in FIG. 2. That is, the HMD 200 of the second embodiment includes a CPU 411, a RAM 412, a ROM 413, cameras 414 (an outward camera 414a and a line-of-sight camera 414b), a display 415, an audio interface (I/F) 416, a communication interface (I/F) 417, sensors 418 (a GPS receiver 418a, a gyro sensor 418b, an acceleration sensor 418c, a geomagnetic sensor 418d, and a touch sensor 418e), and a bus 419 for connecting the respective components. Each component which has the same name as that of each component of the HMD 200 illustrated in FIG. 2 has the same function thereof.

In the same manner as the communication I/F 217, the communication I/F 417 also includes the LAN communication I/F and the near field communication I/F. The communication I/F 417 may further include a telephone network communication I/F for performing a telephone call and transmitting and receiving data by communication with a base station of a mobile telephone communication network, a priority communication I/F for transmitting and receiving data to and from other devices near the HMD 200 by a wired connection means such as a Universal Serial Bus (USB), a close proximity wireless communication I/F for transmitting and receiving data by wireless communication with other devices including close proximity wireless communication devices, and an infrared communication I/F for implementing infrared communication.

In the second embodiment, instead of the display 215, the display 415 displays data, which is displayed on the display 215 of the HMD 200 in the first embodiment.

The instruction received from the user via the display 415 is transmitted to the HMD 200 via the communication I/F 417, and is further transmitted to the instruction reception display unit 221 via the communication I/F 217.

Figure 16A:
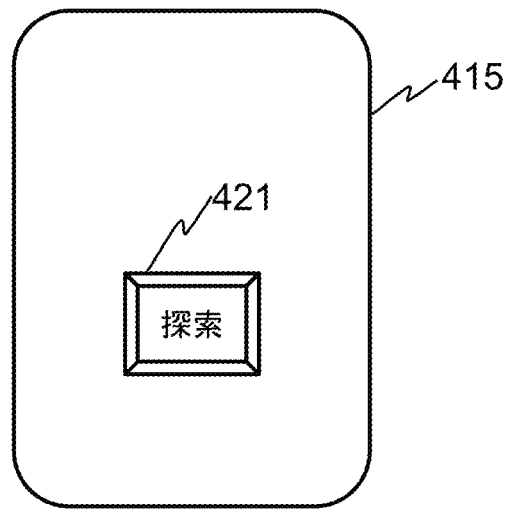
FIG. 16A to FIG. 16C explain a display example on a portable terminal according to the second embodiment.

Hereinafter, with reference to FIG. 16A to FIG. 16C, a display example on the display 415 according to the second embodiment will be described specifically. In the first embodiment, for example, when the user 201 comes near the taxi stand, he or she selects the search instruction button 711 displayed on the display 215. In the second embodiment, as illustrated in FIG. 16A, the CPU 411 of the portable terminal 400 displays a search instruction button 421 on the display 415.

When the user 201 selects the search instruction button 421, the CPU 411 receives the selection instruction. Then, the CPU 411 generates a signal indicating that the selection instruction has been received, and outputs the signal to the HMD 200 via the communication I/F 417. The HMD 200 receives the signal via the communication I/F 217, and passes it to the instruction reception display unit 221.

In the same manner as the first embodiment, the instruction reception display unit 221 provides the image analysis unit 223 with an instruction for causing the photographing processing unit 222 to acquire an image. Then, the instruction reception display unit 221 causes the image analysis unit 223 to extract an object and specify an icon. When specifying more than one icon, the image analysis unit 223 transmits the icon figures corresponding thereto to the mobile terminal 400 via the communication I/F 217.

Figure 16B:
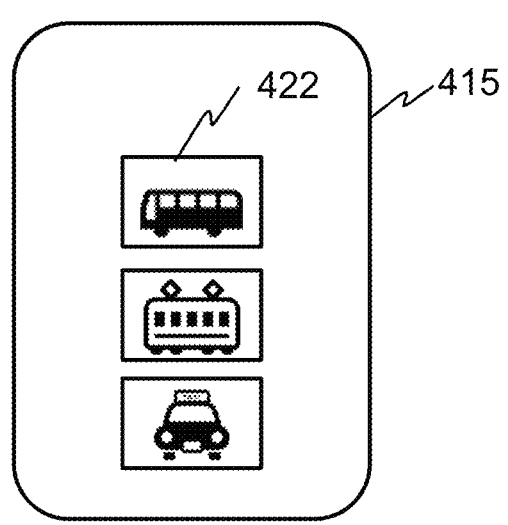

As illustrated in FIG. 16B, on the side of the mobile terminal 400, the CPU 411 displays icon figures 422 as received on the display 415. Upon receiving a selection instruction from the user, the CPU 411 transmits the received selected content to the HMD 200 via the communication I/F 417.

On the side of the HMD 200, upon receiving the selected content via the communication I/F 217, the instruction reception display unit 221 transmits it to the app start unit 224. Upon receiving the selected content, the app start unit 224 accesses the app DB 232 and determines whether the application corresponding thereto is registered by the same method as that of the first embodiment. When the application corresponding thereto is registered, the app start unit 224 starts the application. Then, the instruction reception display unit 221 transmits initial screen data to the portable terminal 400 via the communication I/F 217.

Figure 16C:
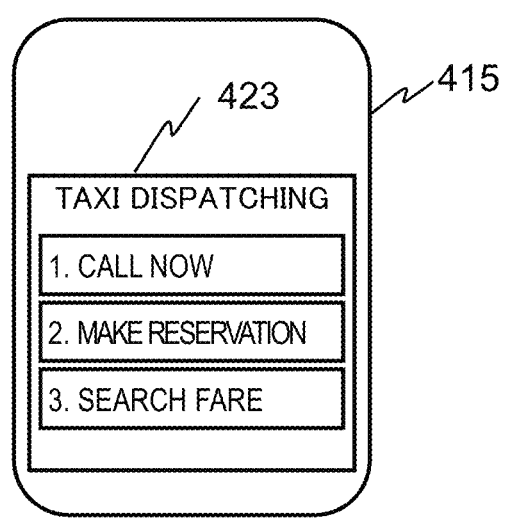

On the side of the mobile terminal 400, as illustrated in FIG. 16C, the CPU 411 displays an initial screen 423 as received on the display 415.

On the other hand, when the application is not registered, the app start unit 224 causes the app acquisition unit 225 to acquire the application from the server 300, performs the same processing as that of the first embodiment, starts the acquired application, and transmits start screen data.

As described above, since the HMD 200 according to the second embodiment cooperates with the portable terminal 400 held by the hand of the user 201, the user 201 can provide an operate instruction by means of the portable terminal 400 held by himself/herself, thereby improving the usability.

The various modifications of the display mode on the display 215 can also be applied to the display of the second embodiment.

For example, a display mode of the selected icon figure may be made different from that of the other non-selected icon figures, or the icon figure may be superimposed on the acquired image. When the icon figure is superimposed on the acquired image, the acquired image is also transmitted to the portable terminal 400.

Various modifications other than those for the display mode of the first embodiment can also be applied to the second embodiment.

Third Embodiment

Next, a third embodiment of the present invention will be described. In the third embodiment, a beacon is further added to the system configuration of the first embodiment or that of the second embodiment. Hereinafter, the third embodiment will be described by explaining an example in which a beacon is added to the first embodiment.

Figure 17A:
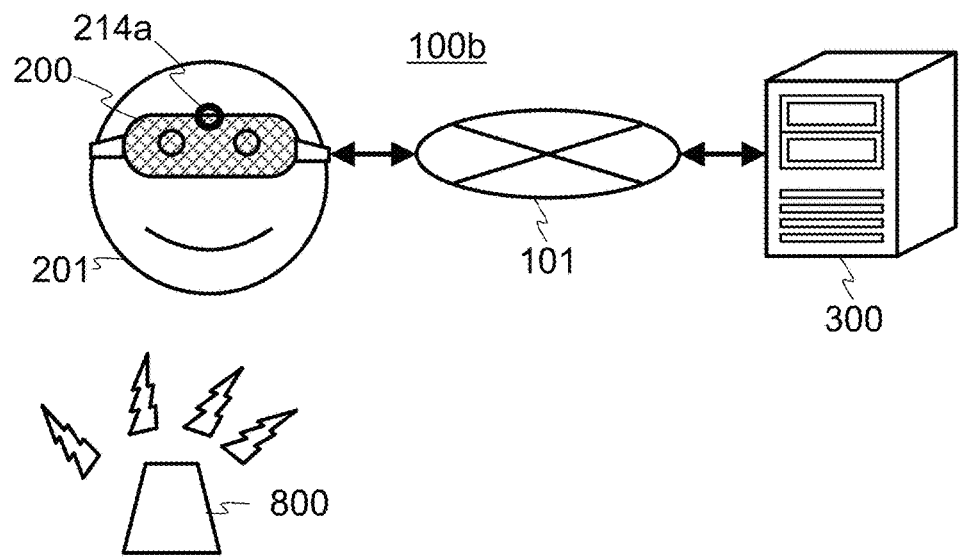
FIG. 17A is a system configuration diagram of a third embodiment.

FIG. 17A is a system configuration diagram of an application control system 100*b* according to the third embodiment. The application control system 100*b* of the third embodiment includes the HMD 200, the server 300, and a beacon 800.

The beacon 800 outputs preset unique ID information. For example, a signal of Bluetooth Low Energy (BLE) specification (hereinafter referred to as a beacon signal) is constantly transmitted. The beacon signal is received only by a terminal in which an application for receiving the beacon signal is active.

The beacon 800 of the third embodiment is a transmitter configured to transmit the beacon signal. The beacon 800 outputs the beacon signal once every few seconds. The beacon signal is, for example, output so that it reaches a range of several tens of meters in radius.

In the same manner as the first embodiment, the HMD 200 and the server 300 are connected via the network 101. The configurations and functions thereof are basically the same as those of the first embodiment.

Meanwhile, the communication I/F 217 of the HMD 200 according to the third embodiment also functions as a signal reception unit for receiving the beacon signal from the beacon 800. That is, the communication I/F 217 can receive the signal of BLE specification.

Figure 17B:
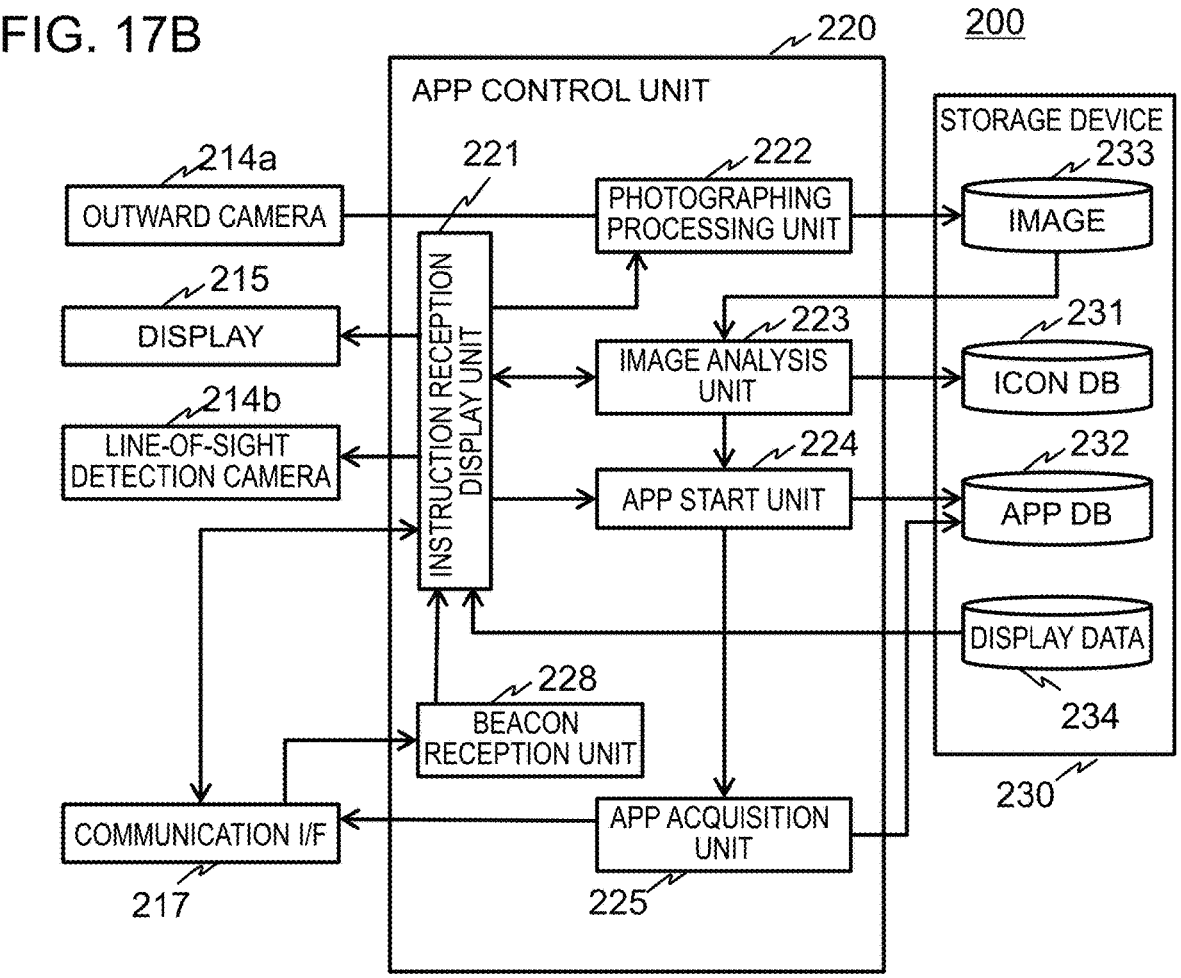
FIG. 17B is a functional block diagram of an HMD according to the third embodiment.

Upon receiving the signal from the beacon 800, the HMD 200 enters the search mode. In order to realize the above, as illustrated in FIG. 17B, the HMD 200 according to the third embodiment further includes a beacon reception unit 228 configured to perform reception processing of the beacon signal in addition to the function of the first embodiment.

Upon receiving the beacon signal from the beacon 800, the beacon reception unit 228 transmits a search instruction to the instruction reception display unit 221.

As described above, the beacon signal is received only by a terminal having an application (hereinafter, referred to as a beacon reception app) for performing processing in accordance with the beacon signal. In the third embodiment, a program of the beacon reception app is registered in the storage device 230. Then, upon start of the HMD 200 or in accordance with an instruction from the user 201, the CPU 211 loads the beacon reception app onto the RAM 212 to execute it, thereby realizing the communication I/F 217 and the beacon reception unit 228 for receiving the beacon signal. After being started, the beacon reception app is constantly executed in the background.

As described above, in the third embodiment, when entering an area where the beacon signal can be received, the HMD 200 receives the beacon signal via the communication I/F 217. Then, the received beacon signal is transmitted to the beacon reception unit 228, and then is transmitted to the instruction reception display unit 221 as the search instruction.

The instruction reception display unit 221 that has received the search instruction causes, in the same manner as the first embodiment, the photographing processing unit 222 to start capturing an image, that is, acquiring the image 233. Each time the image 233 is acquired, the image analysis unit 223 analyzes the image 233 to extract an object and specify an icon. Then, the app start unit 224 starts the application associated with the specified icon.

Figure 18A:
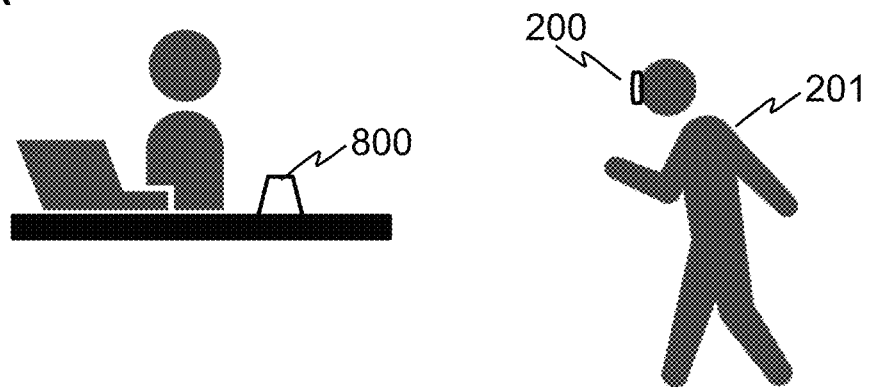
FIG. 18A to FIG. 18C explain application control processing according to the third embodiment.

Hereinafter, with reference to FIG. 18A, an example in which the beacon 800 is placed in an accounting area of such as a store or a restaurant will be described. In this case, the beacon 800 is placed near the accounting register (cash register). Generally, marks of usable credit cards and marks of usable IC cards are shown near the cash register.

As the user 201 approaches the cash register, the HMD 200 receives the beacon signal from the beacon 800. Upon receiving the beacon signal via the communication I/F 217, the instruction reception display unit 221 causes the photographing processing unit 222 to acquire an image in the visual field. The image analysis unit 223 extracts an object and specifies an icon.

Figure 18B:
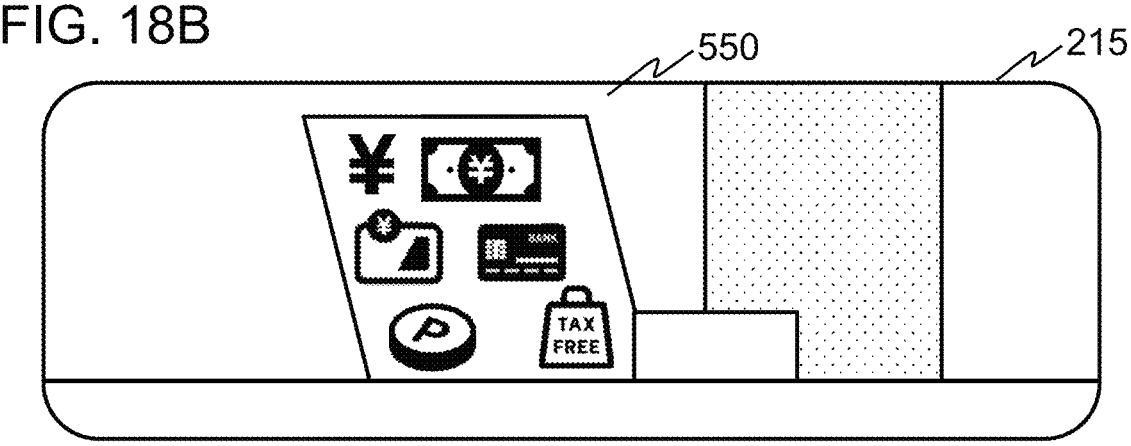
Figure 18C:
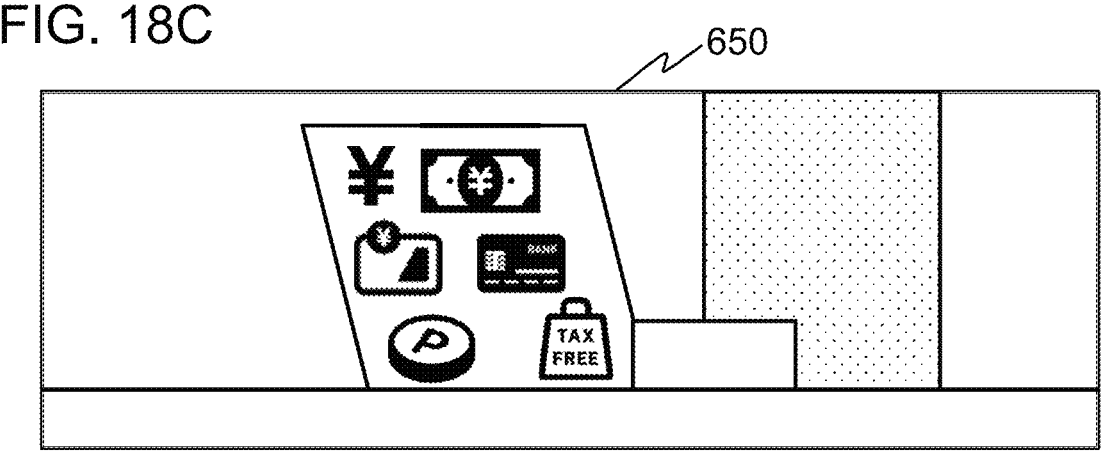

In the accounting area, the user 201 sees, for example, a scene (real image) 550 as illustrated in FIG. 18B through the transmission type display 215. Specifically, the user 201 sees the scene in which stickers of various credit cards and electronic money that can be used at this store are attached near the cash register. Here, by receiving the beacon signal, the photographing processing unit 222 acquires an image 650 as illustrated in FIG. 18C.

Figure 19A:
FIG. 19A to FIG. 19D explain application control processing according to the third embodiment.

The image analysis unit 223 extracts an object group from the image 650. FIG. 19A illustrates an example of an object group 620 as extracted. The image analysis unit 223 refers to the icon DB 231 to specify an object that is an icon.

Figure 19B:
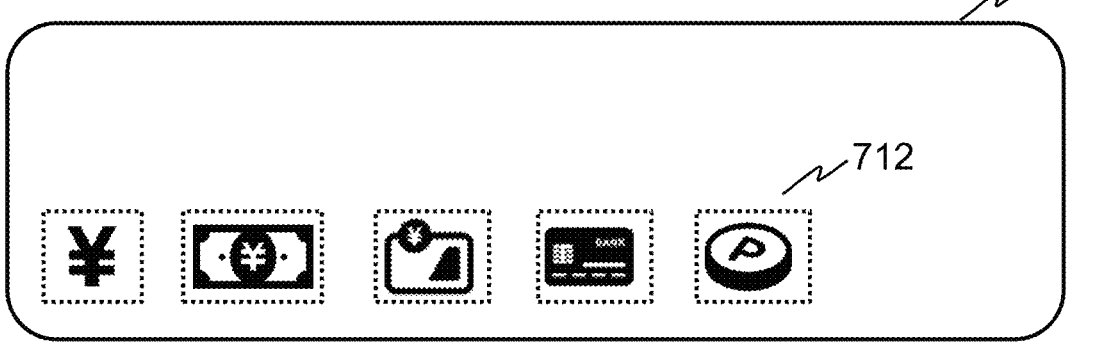

The instruction reception display unit 221 extracts, from the icon DB 231, the icon figures 231*b* of the objects specified as the icons and displays them on the display 215. FIG. 19B illustrates a display example thereof. In this connection, FIG. 19B and the subsequent drawings omit to illustrate the external scene that comes into the visual field of the user 201 through the transmission display 215.

Figure 19C:
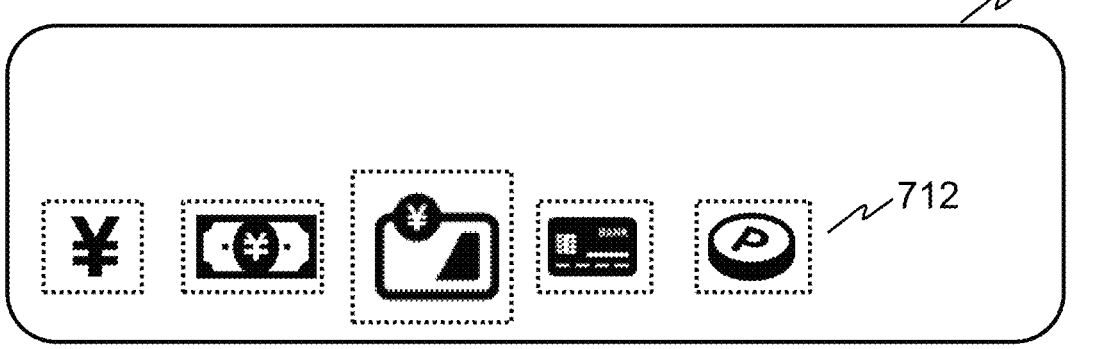

The instruction reception display unit 221 receives a selection instruction from the user 201. The instruction reception display unit 221 may display the selected icon figure 231*b* in a mode different from that of the other icon figures. For example, as illustrated in FIG. 19C, the selected icon figure may be displayed in a larger size than other icon figures.

Figure 19D:
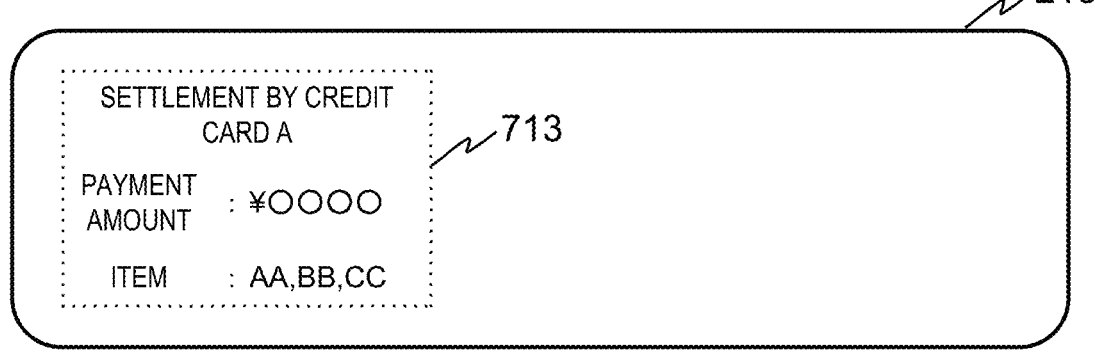

The app start unit 224 starts the application associated with the selected icon and registered in the app DB 232. Here, as illustrated in FIG. 19D, a screen for settlement by a card indicated by the icon figure is displayed on the display 215.

When the application associated with the selected icon is not registered, in the same manner as the first embodiment, the app acquisition unit 225 acquires the application from the server 300.

As described above, in the third embodiment, the beacon is placed near the object corresponding to the icon of the external field. The HMD 200 starts the application control processing by receiving a signal from the beacon 800 instead of entering the search mode.

Therefore, the third embodiment can obtain the same advantageous effects as those of the first embodiment. Furthermore, according to the third embodiment, an operation of turning on the search mode becomes unnecessary, thereby reducing labor of the user 201 and increasing the convenience.

Tenth Modification

In the third embodiment, the beacon signal output from the beacon 800 is basically a signal indicating that an object corresponding to an icon exists nearby. Meanwhile, the beacon signal output by the beacon 800 may additionally include information other than location information, for example, information for limiting the processing performed nearby.

According to the tenth modification, limitation in the type 231*c* of the icon to be collated by the image analysis unit 223 can be provided. As a result, it is possible to reduce troublesomeness that reaction to each mark in the external field frequently occurs.

For example, it may be configured to specify only an icon related to settlement near a place in which settlement is carried out. In this case, upon receiving the beacon signal, the instruction reception display unit 221 outputs, to the image analysis unit 223, not only a search instruction but also the beacon signal.

The image analysis unit 223 analyzes the beacon signal and specifies the type 231*c* of the icon which is required. Then, in the process of specifying the icon corresponding to the extracted object, the image analysis unit 223 collates the extracted object only with the icons that match the type 231*c* as specified.

For example, in the example illustrated in FIG. 19B, each of the icon types registered in the icon DB 231 is, from the left, settlement, settlement, settlement, settlement, and point assignment, respectively. When the limitation that icons each of which the type 231*c* is settlement are to be extracted is registered in the beacon signal, the rightmost icon is not displayed on the display 215.

In the same manner as the second embodiment, an icon may be displayed on the mobile terminal 400.

Eleventh Modification

The HMD 200 according to the above-described embodiments and modifications may further include a user authentication function.

The user authentication function is a security function configured to authenticate that the user 201 of the HMD 200 is the user 201 registered in advance, and provide an instruction for performing the application control processing only when authentication is successful.

FIG. 20 is a functional block diagram of the HMD 200 according to the eleventh modification. The app control unit 220 according to the eleventh modification further includes, in addition to the functions of the first embodiment, an authentication unit 229 configured to authenticate the user 201 of the HMD 200.

As user authentication, for example, iris authentication may be used. In this case, the user authentication function is implemented by, for example, the authentication unit 229 and the line-of-sight detection camera 214*b*.

In the process of iris authentication, the iris of the user 201 is captured in advance and stored in the ROM 213 as verification data 236. When the user 201 wears the HMD 200, the authentication unit 229 acquires an image of the iris of the user 201 by means of the line-of-sight detection camera 214*b*, and collates the acquired image with the image of the iris stored in advance. When the verification is successful, the authentication unit 229 notifies the instruction reception display unit 221 that the user 201 is the authorized user. Upon receiving the notification that the verification is successful, the instruction reception display unit 221 displays the search instruction button on the display 215.

The user authentication is not limited to the method above. For example, the method may be unlocking by eye tracking of an authentication pattern, authentication by the number of blinks at a predetermined time period or an eye blinking operation at a predetermined time interval, or a fingerprint authentication function. The methods above may be combined with each other, or other authentication methods may be used. In this connection, the authentication pattern is generated by, for example, the instruction reception display unit 221.

As described above, according to the eleventh embodiment, it is possible to prevent the processing from being performed by spoofing of another person in the settlement processing. As a result, it is possible to realize the HMD 200 with high safety while involving both convenience and high operability.

Twelfth Modification

In the first embodiment, the third embodiment, and the respective modifications, the examples in which the HMD 200 is used as the display terminal has been described, meanwhile, the display terminal is not limited thereto. The display terminal may be a portable terminal such as a smart phone or a tablet type terminal having a camera and a communication function.

In any case, the display terminal configured as above can start the application simply by capturing an image of a real object that is similar to an icon figure. Accordingly, labor of finding the icon of the application to be used from the display screen and starting it can be eliminated, thereby improving the usability.

The first embodiment and the second embodiment are configured to acquire the image 233 of the external field and start analyzing it when the search mode is turned on, meanwhile, the present invention is not limited thereto. For example, the image analysis unit 223 may be configured to constantly acquire the image 233 of the external field at a predetermined time interval, and specify the icon each time the image is acquired.

In this case, the display 215 constantly displays selectable display icons 712 at each timing. The user 201 may select the icon from among the display icons 712 at a timing at which the application is to be executed.

The present invention is not limited to the embodiment and the modifications described above, and other various modifications are included therein. For example, the embodiment and the modifications described above have been explained in detail in order to clarify the present invention, but are not necessarily limited to those having all the configurations as described. In addition, a part of the configuration of the present embodiment and the modifications can be replaced with that of other embodiments and other modifications, and the configuration of other embodiments and other modifications can be added to the configuration of the present embodiment. Furthermore, it is possible to add, delete, or replace another configuration with respect to a part of the configuration of the present embodiment and the modifications.

Some or all the configurations described above, functions, processing units, and processing means may be implemented by hardware, for example, by designing them with an integrated circuit. In addition, the configurations and functions described above may be implemented by software by interpreting and executing programs in which the processor implements the respective functions. Information such as programs, tables, and files for implementing various functions can be placed in recording devices such as a memory, a hard disk, and an SSD (Solid State Drive), or recording media such as an IC card, an SD card, and a DVD.

Furthermore, the control lines and the information lines which are considered to be necessary for the purpose of explanation are indicated herein, but not all the control lines and the information lines of actual products are necessarily indicated. It may be considered that almost all the configurations are actually connected to each other.

REFERENCE SIGNS LIST

100: application control system, 100a: application control system, 100b: application control system, 101: network, 200: HMD, 201: user, 211: CPU, 212: RAM, 213: ROM, 214: cameras, 214a: outward camera, 214b: line-of-sight detection camera, 215: display, 216: audio I/F, 217: communication I/F, 218: sensors, 218a: GPS receiver, 218b: gyro sensor, 218c: acceleration sensor, 218d: geomagnetic sensor, 218e: touch sensor, 219: bus, 220: app control unit, 221: instruction reception display unit, 222: photographing processing unit, 223: image analysis unit, 224: app start unit, 225: app acquisition unit, 228: beacon reception unit, 229: authentication unit, 230: storage device,
231: icon DB, 231a: icon ID, 231b: icon figure, 231c: type, 231d: content, 232: app DB, 232a: icon ID, 232b: app name, 232c: app ID, 232d: app storage location, 233: image, 234: display data, 235: store DB, 236: verification data, 241: display control unit, 242: display image generation unit, 243: line-of-sight detection unit, 244: analysis control unit
300: server, 311: icon bank, 311a: icon ID, 311b: icon figure, 311c: type, 311d: content, 311e: corresponding app URL, 311f: relevant information,
400: portable terminal, 411: CPU, 412: RAM, 413: ROM, 414: cameras, 414a: outward camera, 414b: line-of-sight camera, 415: display, 417: communication I/F, 418: sensors, 418a: GPS receiver, 418b: gyro sensor, 418c: acceleration sensor, 418d: geomagnetic sensor, 418e: touch sensor, 419: bus, 421: search instruction button, 422: icon figure, 423: initial screen
501: signboard, 510: real image, 511: bus figure, 512: train figure, 513: taxi figure, 514: people, 515: flowers, 516: weeds, 517: dog, 518: mark, 531: QR code, 532: QR code with icon, 541: receipt, 550: real image
601: image, 602: object, 603: taxi dispatch app, 610: image, 611: figure, 612: figure, 613: figure, 614: figure, 615: figure, 616: figure, 617: figure, 618: circle, 619: ellipse, 620: object group, 621: character string, 622: character string, 623: character string, 650: image,
711: search instruction button, 712: display icon, 713: initial screen data, 714: app icon, 715: instruction button, 800: beacon

The invention claimed is:

1. A display terminal including a photographing device, the display terminal comprising:
a communication interface configured to perform data communication with an external device and to perform as a signal reception unit for receiving a beacon signal from a beacon; and
a processor which when executing at least one program configures the processor to:
analyze an image captured by the photographing device;
extract one or more real objects on the image which exist in an external field;
specify an icon figure matching each of the one or more real objects on the image; and
when the communication interface receives the beacon signal which includes the information for limiting the processing performed nearby from the beacon, the processor enters a search mode to capture the image in a visual field by the photographing device and starts the program;
analyze the beacon signal to specify a type of an icon which is required;
collates the extracted one or more real objects only with the one or more icons that match the type as specified;
specify one or more icons, and
when multiple icon figures are present in the image:
specify each of the icon figures as an icon;
extract one or more icons of a specified type based on a selection of the specified type;
display the extracted one or more icons corresponding to the multiple icon figures, respectively, on the display terminal; and
start an application associated with the extracted one or more icons in response to an instruction by a user to select one of the extracted one or more icons; and
when only one icon figure is present in the image:
specify the only one icon figure as an icon; and
start an application associated with the only one icon automatically.

2. The display terminal according to claim 1, wherein the processor is further configured to:
display, when the selected one of the extracted one or more icons comprises a plurality of icons, the plurality of icons on a display device of the display terminal, and receive a selection instruction with respect to one icon from among the plurality of icons as displayed; and
start the application associated with the one icon that has been selected by the selection instruction.

3. The display terminal according to claim 1, wherein the processor is further configured to:
when there is a plurality of applications associated with the icon as specified, display application icons that are data for identifying each of the plurality of applications on a display device of the display terminal, and receive a selection instruction with respect to one application icon from among the application icons as displayed; and
start one of the plurality of applications identified by the one application icon that has been selected by the selection instruction.

4. The display terminal according to claim 1, further comprising:
an icon database configured to register in advance, for the icon, shape information of the icon and a content of processing of the application associated with the icon, wherein the processor is further configured to collate the region size information with the content registered in the icon database so as to specify the icon that matches the content as a relevant icon.

5. The display terminal according to claim 4, wherein when the icon comprises a plurality of icons, the processor is further configured to use predetermined auxiliary information to reduce the number of the plurality of icons to be collated in the icon database.

6. The display terminal according to claim 5, wherein the auxiliary information is obtained from a QR code nearest to the real object.

7. The display terminal according to claim 5, wherein the auxiliary information is current location information of the display terminal acquired by a location information acquisition device provided in the display terminal.

8. The display terminal according to claim 1, wherein the real object is at least one of a figure and a character string.

9. The display terminal according to claim 1, wherein the processor is further configured to, when the application associated with the icon specified is not registered in a storage device of the display terminal, download the application through the communication interface.

10. The display terminal according to claim 1, wherein the processor is further configured to;
authenticate a user of the display terminal; and
start the application when the user is authenticated as an authorized user.

11. The display terminal according to claim 1, wherein the processor is further configured to:
receive an instruction to perform analysis; and
when receiving the instruction, analyze the image.

12. The display terminal according to claim 1, wherein the processor is further configured to:
receive a signal from an outside; and
when receiving a signal of a predetermined type, analyze the image.

13. The display terminal according to claim 1, wherein the display terminal is a head mounted display.

14. The display terminal according to claim 1, wherein the beacon signal indicates that an object corresponding to an icon exists nearby.

15. The display terminal according to claim 1, wherein when displaying the extracted one or more icons corresponding to the multiple icon figures, respectively, on the display terminal, not displaying any other icons that do not correspond to the specified type.

16. An application control system including a display terminal and a server connected to the display terminal through a network, the application control system comprising:
a beacon;
a communication interface configured to perform data communication with an external device and perform as a signal reception unit for receiving a beacon signal from the beacon;
a photographing device;
a storage device; and
a processor which when executing at least one program configures the processor to:
analyze an image captured by the photographing device, extract one or more real objects on the image which exist in an external field, and
specify an icon figure matching each of the one or more real objects on the image; and
when the communication interface receives the beacon signal which includes the information for limiting the processing performed nearby from the beacon, the processor enters a search mode to capture the image in visual field by the photographing device and starts the program;
analyze the beacon signal to specify a type of an icon which is required;
collates the extracted one or more real objects only with the one or more icons that match the type as specified;
specify one or more icons, and
when multiple icon figures are present in the image:
specify each of the icon figures as an icon;
extract one or more icons of a specified type based on a selection of the specified type;
display the extracted one or more icons corresponding to the multiple icon figures, respectively, on the display terminal;
start an application associated with one of the extracted one or more icons in response to an instruction by a user to select one of the extracted one or more icons when determining that the application is stored in the storage device; and
acquire the application from the server when determining that the application associated with the selected one of the extracted one or more icons is not stored in the storage device; and
when only one icon figure is present in the image:
specify the only one icon figure as an icon;
determine whether an application associated with the only one icon as specified is stored in the storage device;
when determining that the application is stored, start the application automatically; and
acquire the application from the server when determining that the application associated with the only one icon is not stored in the storage device.

17. The application control system according to claim 16, further comprising a portable terminal that transmits and receives data to and from the display terminal by near field communication, wherein
the display terminal is a head mounted display,
the application control system further includes:
a communication interface for transmitting and receiving data to and from the portable terminal, and the processor is further configured to:
when the selected one of the extracted one or more icons comprises a plurality of icons, transmit each of the plurality of icons to the portable terminal through the communication interface, and receive a selection instruction with respect to one icon from among the plurality of icons received from the portable terminal through the communication interface; and
start the application associated with the one icon that has been selected by the selection instruction.

18. The application control system according to claim 16, wherein
the beacon signal indicates that an object corresponding to an icon exists nearby.

19. The application control system according to claim 16, wherein
when displaying the extracted one or more icons corresponding to the multiple icon figures, respectively, on the display terminal, not displaying any other icons that do not correspond to the specified type.

20. An application control method for a display terminal including a photographing device, comprising the steps of:
entering a search mode upon receiving beacon signal which includes the information for limiting the processing performed nearby from a beacon;
analyzing the beacon signal to specify a type of an icon which is required;
capturing an image by means of the photographing device and acquiring the image;
extracting one or more real objects on the image which exists in an external field from the image as acquired;
determining whether an icon figure matching each of the one or more real objects on the image is registered in advance information of the image region as extracted;
collating the extracted one or more real objects only with the one or more icons that match the type as specified; and
specifying one or more icons, when multiple icon figures are registered:
extracting one or more icon figures of a specified type based on a selection of the specified type;
displaying the extracted one or more icon figures on the display terminal; and
starting an application associated with the selected icon figure in response an instruction by a user to select one of the extracted one or more icon figures; and
when only one icon figure matching the one or more real objects on the image is registered, start an application associated with the only one icon figure automatically.

21. The application control method according to claim 20, wherein
the beacon signal indicates that an object corresponding to an icon exists nearby.

22. The application control method according to claim 20, wherein
when displaying the extracted one or more icon figures on the display terminal, not displaying any other icon figures that do not correspond to the specified type.

* * * * *